US012232158B2

(12) United States Patent
Jamieson et al.

(10) Patent No.: US 12,232,158 B2
(45) Date of Patent: Feb. 18, 2025

(54) RECONFIGURABLE METAMATERIAL SURFACE FOR mmWAVE NETWORKS

(71) Applicants: The Trustees of Princeton University, Princeton, NJ (US); University of Massachusetts, Hadley, MA (US); Mohammad Mazaheri, Waterloo (CA); Omid Salehi-Abari, Los Angeles, CA (US)

(72) Inventors: Kyle Jamieson, Princeton, NJ (US); Kun Woo Cho, Princeton, NJ (US); Mohammad Mazaheri, Waterloo (CA); Jeremy Gummeson, Belchertown, MA (US); Omid Salehi-Abari, Los Angeles, CA (US)

(73) Assignees: The Trustees of Princeton University, Princeton, NJ (US); University of Massachusetts, Hadley, MA (US)

( * ) Notice: Subject to any disclaimer, the term of this patent is extended or adjusted under 35 U.S.C. 154(b) by 504 days.

(21) Appl. No.: 17/710,772

(22) Filed: Mar. 31, 2022

(65) Prior Publication Data
US 2022/0330259 A1    Oct. 13, 2022

Related U.S. Application Data

(60) Provisional application No. 63/168,703, filed on Mar. 31, 2021.

(51) Int. Cl.
*H04W 72/04*    (2023.01)
*H04B 17/13*    (2015.01)
(Continued)

(52) U.S. Cl.
CPC .......... *H04W 72/542* (2023.01); *H04B 17/13* (2015.01); *H04B 17/391* (2015.01); *H04W 72/0453* (2013.01); *H04W 72/046* (2013.01)

(58) Field of Classification Search
CPC .......... H04W 72/542; H04W 72/0453; H04W 72/046; H04B 17/13; H04B 17/391; H04B 17/3912
See application file for complete search history.

(56) References Cited

U.S. PATENT DOCUMENTS

| 2017/0168020 A1* | 6/2017 | Omata | G01N 29/11 |
| 2024/0129752 A1* | 4/2024 | Park | H01Q 3/46 |

OTHER PUBLICATIONS

Chen, K. et al., "A Reconfigurable Active Huygens' Metalens," Advanced Materials, 29(1606422), 7 pages (2017) (Year: 2017).*

(Continued)

*Primary Examiner* — Lan-Huong Truong
(74) *Attorney, Agent, or Firm* — HAMILTON, BROOK, SMITH & REYNOLDS, P.C.

(57) ABSTRACT

Use of high frequency waves, such a millimeter waves, in many circumstances is prevented due to their inability to diffract around common obstacles. Disclosed herein is a system and method for transforming an incident high frequency wave. The system includes meta-atom pairs that define a surface. The meta-atom pairs generate an electro-magnetic response by interacting with an incident wave. This electro-magnetic response can be modulated by applying voltage to the meta-atom pairs. The electro-magnetic response transforms the incident wave into an emitted wave based on its controlled properties. The system and method are able to, by changing the voltage applied, steer the emitted wave a full 360 degrees as wells as transmit it through the surface without significant power loss. Embodiments enable the transmission through or around many obstacles that would normally interfere with high frequency waves.

20 Claims, 26 Drawing Sheets
(6 of 26 Drawing Sheet(s) Filed in Color)

(51) Int. Cl.
  *H04B 17/391* (2015.01)
  *H04W 72/044* (2023.01)
  *H04W 72/0453* (2023.01)
  *H04W 72/542* (2023.01)

(56) References Cited

OTHER PUBLICATIONS

Chen, M. et al., "Huygens' metasurfaces from microwaves to optics: a review," Nanophotonics, 7(6): 1207-1231 (2018) (Year: 2018).*
Abari, O. et al., "Enabling High-Quality Untethered Virtual Reality," The Proceedings of the 14th USENIX Symposium on Networked Systems Design and Implementation (NSDI '17), Mar. 27-29, 2017, Boston, MA, USA, 15 pages.
Arun, V. et al., "RFocus: Beamforming Using Thousands of Passive Antennas," The Proceedings of the 17th USENIX Symposium on Networked Systems Design and Implementation (NSDI '20), Feb. 25-27, 2020, Santa Clara, CA, USA, 17 pages.
Chen, K. et al., "A Reconfigurable Active Huygens' Metalens," Advanced Materials, 29(1606422), 7 pages (2017).
Chen, M. et al., "Huygens' metasurfaces from microwaves to optics: a review," Nanophotonics, 7(6): 1207-1231 (2018).
Chen, L. et al., "Pushing the Physical Limits of IoT Devices with Programmable Metasurfaces," In 18th USENIX Symposium on Networked Systems Design and Implementation (NSDI '21), 14 pages (2021).
Ding, X. et al., "Metasurface holographic image projection based on mathematical properties of Fourier transform," PhotoniX, 1:16, 12 pages (2020).
Hassanieh, H. et al., "Fast Millimeter Wave Beam Alignment," SIGCOMM '18: Proceedings of the 2018 Conference of the ACM Special Interest Group on Data Communication, pp. 432-445 (2018).
Li, Z. et al., "Towards Programming the Radio Environment with Large Arrays of Inexpensive Antennas," The Proceedings of the 16th USENIX Symposium on Networked Systems Design and Implementation (NSDI '19), Feb. 26-28, 2019, Boston, MA, USA, 16 pages.
Liu, M. et al., "Huygens' Metadevices for Parametric Waves," Physical Review X 8: 031077-1-031077-25 (2018).
MACOM Partners in RF & Microwave, SPICE Model, MAVR-011020-14110 rev B, 11 pages (Mar. 12, 2021).
Netgear, Nighthawk 12-Stream Dual-Band WiFi 6 Router, 6Gbps, AX6000 WiFi Router (RAX120), 6 pages (Date not available).
Poole, Clive and Izzat Darwazeh, Microwave Active Circuit Analysis and Design, Chapter 15, Ed. Elsevier, 43 pages (2016).
Shlezinger, N. et al., "Dynamic Metasurface Antennas for 6G Extreme Massive MIMO Communications," IEEE Wireless Communications, 28(2): 106-113 (2021).
Smith, D.R. et al., "Metamaterials and Negative Refractive Index," Science, 305: 788-792 (2004).
SPW Industrial, s H.Frequency Laminates R4003C, 18"×24" .032" Thick, 1/1 Oz Cu, 6 pages, Retrieved from the Internet at: https://spwindustrial.com/rogers-h-frequency-laminates-r4003c-18-x-24-032-thick-1-1-oz-cu/, Retrieved from the Internet on: Sep. 2, 2022.
Tan, X. et al., "Enabling Indoor Mobile Millimeter-wave Networks Based on Smart Reflect-arrays," IEEE Infocom 2018, IEEE Conference on Computer Communications, 9 pages.
Wu, Z. et al., "Tunable Metasurfaces: A Polarization Rotator Design," Physical Review X 9: 011036-1-011036-15 (2019).
Zhang, L. et al., "Space-time-coding digital metasurfaces," Nature Communications, 9.1: 1-11 (2018).

* cited by examiner

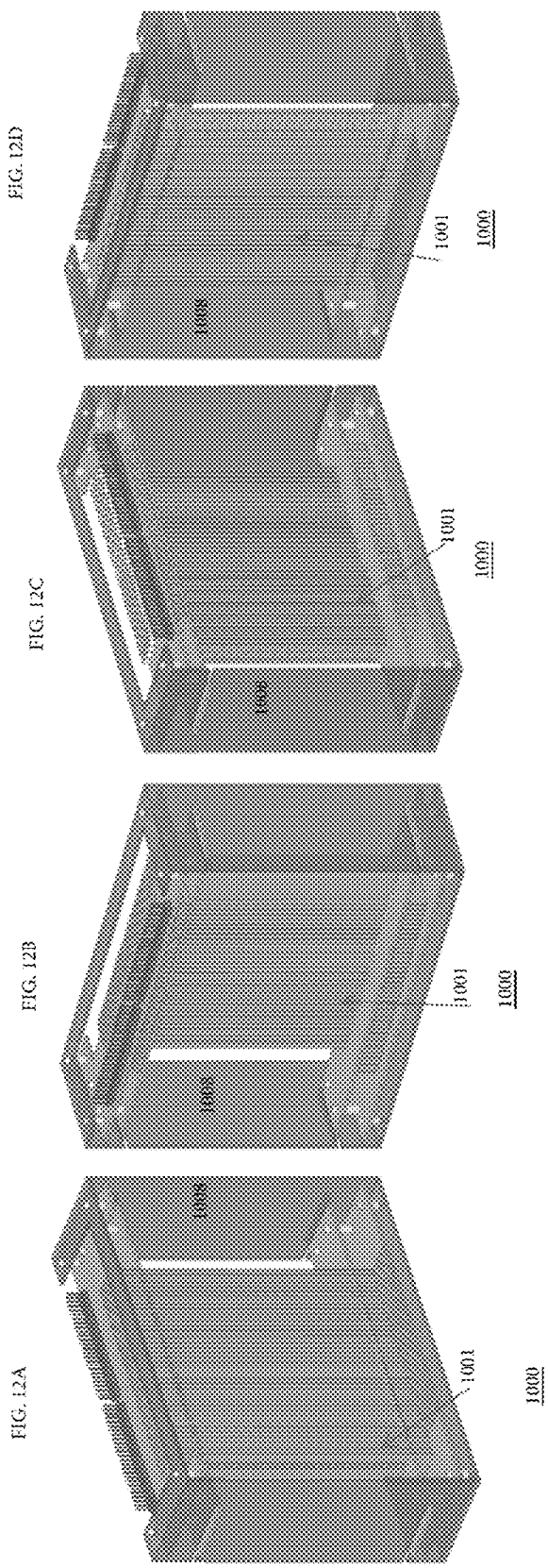

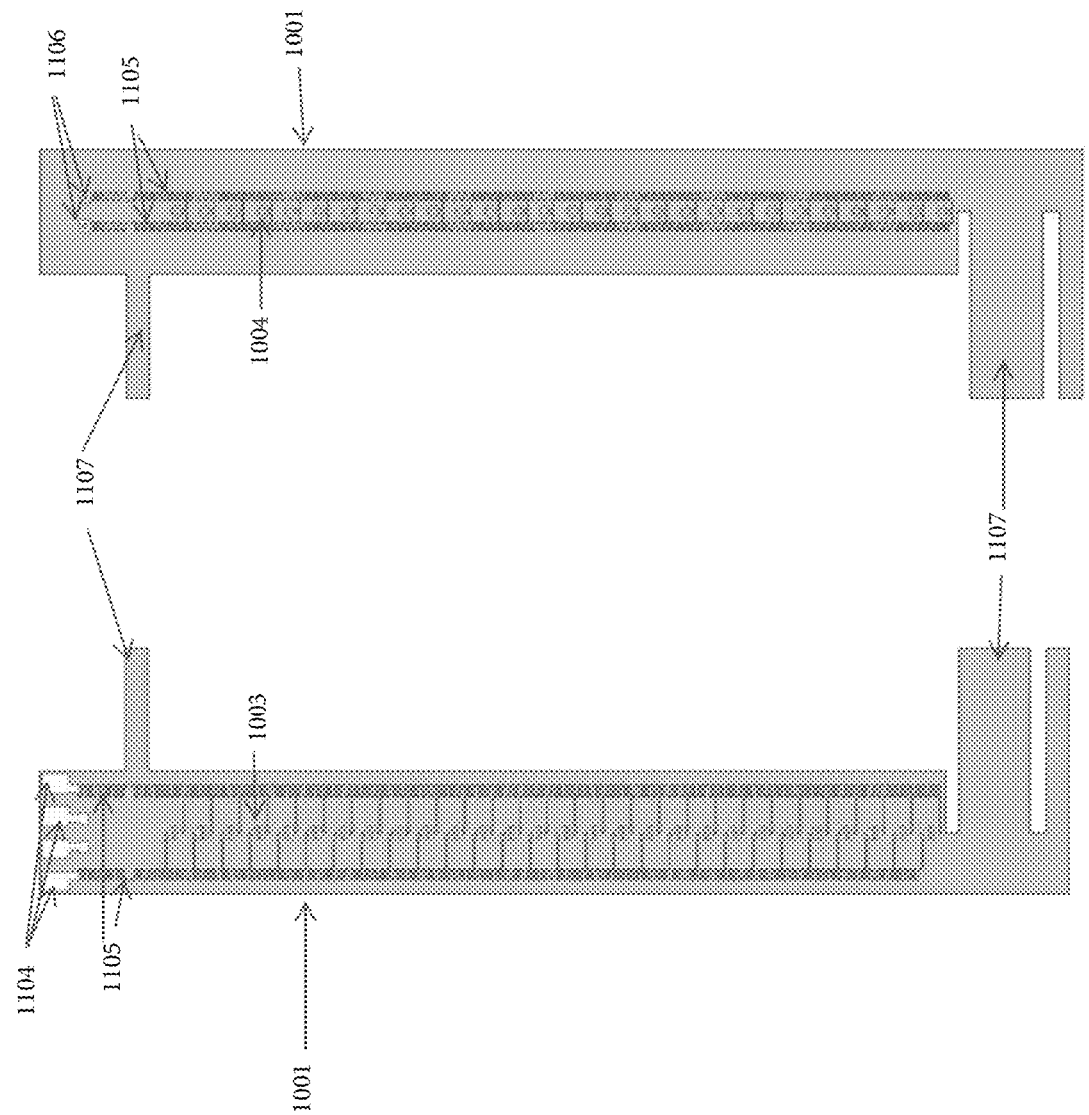

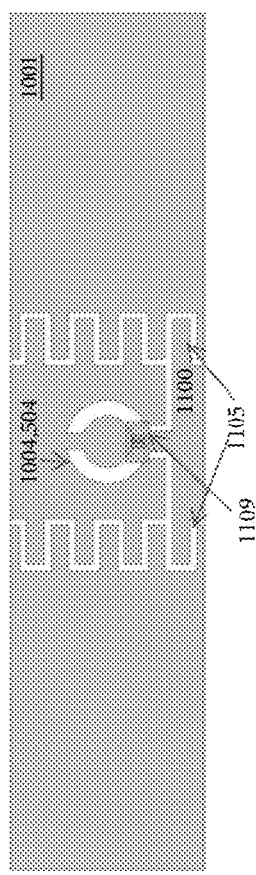
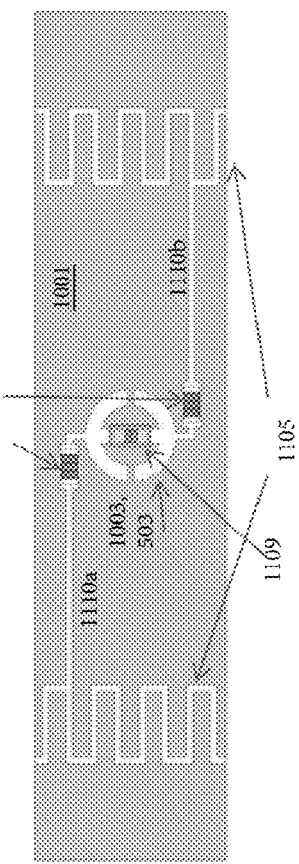
FIG. 14B
FIG. 14A

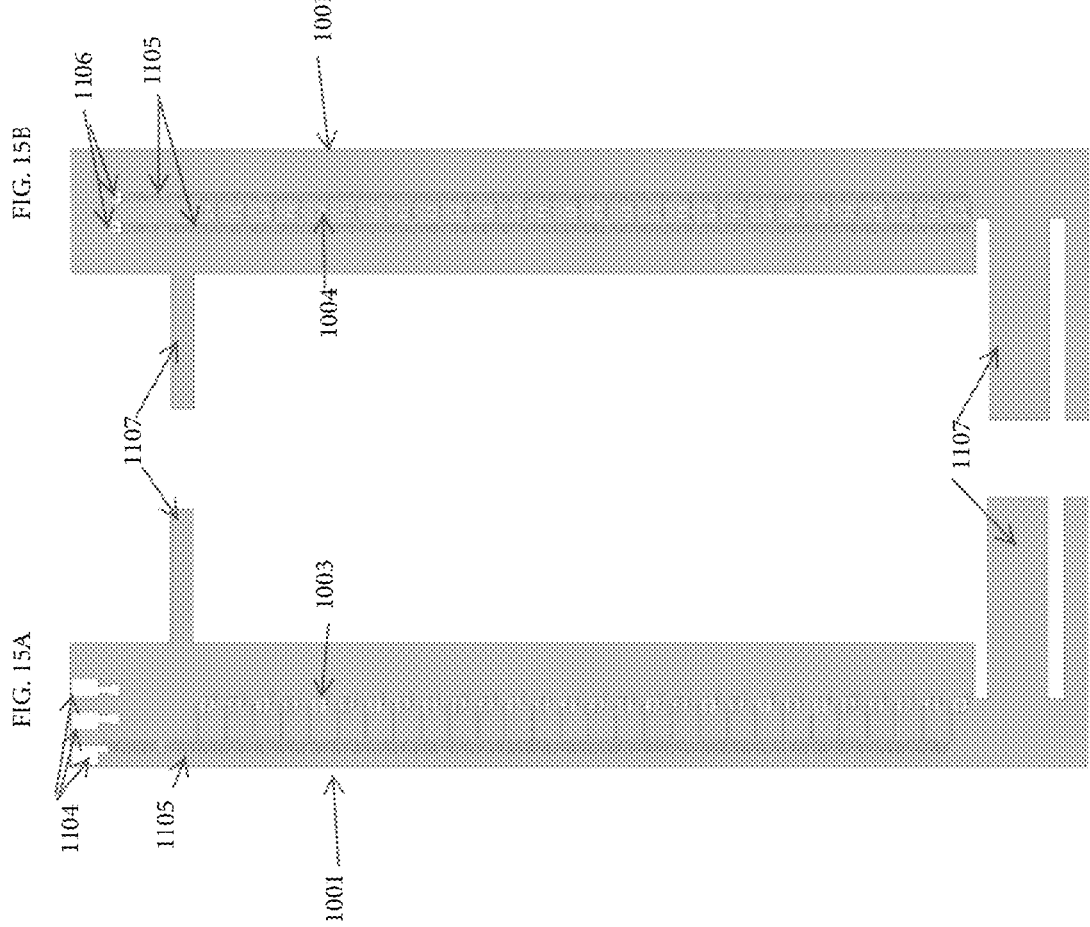

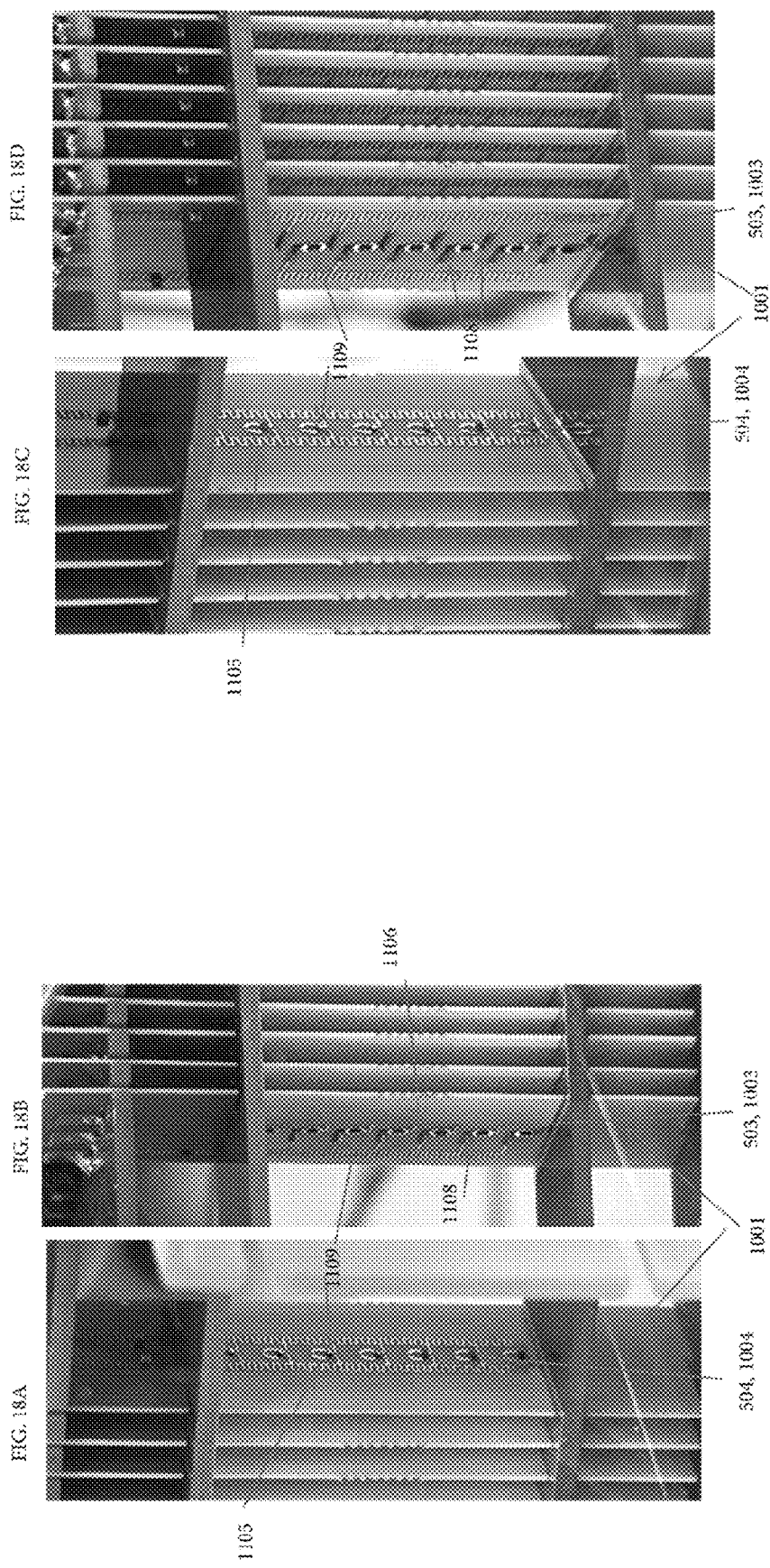

(a) 5G through-wall coverage.

(b) Indoor VR/AR systems.

(c) mmWave backhaul.

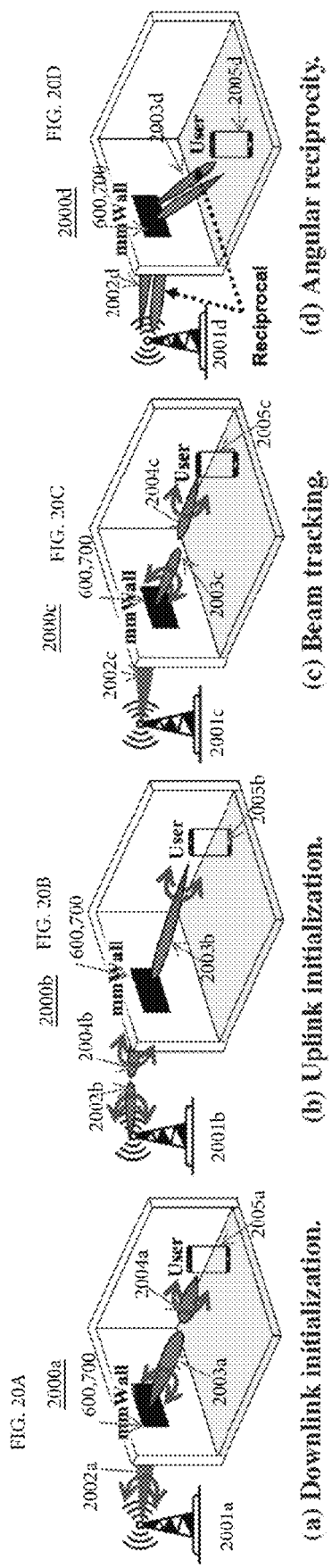

RECONFIGURABLE METAMATERIAL SURFACE FOR mmWAVE NETWORKS

RELATED APPLICATION

This application claims the benefit of U.S. Provisional Application No. 63/168,703, filed on Mar. 31, 2021. The entire teachings of the above application are incorporated herein by reference.

GOVERNMENT SUPPORT

This invention was made with government support under Grant No. CNS-1617161 from the National Science Foundation. The government has certain rights in the invention.

BACKGROUND

The ability to use the millimeter-wave (mmWave) spectrum, between microwave and infrared waves, to transmit data and information is becoming more valuable and necessary with the spread and evolution of 5G technology. The ability to use transmissions in the mmWave spectrum is essential to fulfill demands for high spectral efficiency and low latency wireless networks. As computer processing power improves, wireless transmission speed must also increase to match the increased data use and production of computer applications. Higher carrier frequencies, such as mmWave, offer greater network capacity. For example, the maximum carrier frequency of the 4G-LTE band at 2.4 GHz provides an available spectral bandwidth of only 100 MHz, while mmWave (above 24 GHz) can easily support spectral bandwidths five to ten times greater. The increased spectral bandwidths enabled by using the mmWave spectrum enable multi-Gbit/second data transmission rates that can support the ever-increasing need for faster wireless data transfer. mmWave transmissions enable a plethora of mobile and/or wireless applications, e.g., virtual reality (VR)/augmented reality (AR) for multiplayer games, camera-tracking in smart stores, and robot automation in smart warehouses, that currently cannot be implemented using the existing low spectrum transmission spectrums.

SUMMARY

While mmWave transmission has the potential to enable otherwise infeasible technology, one problem that prevents more widespread adoption of the more efficient and faster mmWave spectrum for wireless transmissions is that, unlike transmissions at lower transmission frequencies, mmWave transmissions are extremely vulnerable to blockages by walls and other obstacles. mmWave transmissions often do not diffract around obstacles with a size significantly larger than its wavelength. Since mmWave transmissions have extremely short wavelengths, due to their high frequency, mmWave transmissions experience significant losses when traversing walls, and thus, require a line-of-sight (LoS) path between the transmitter and receiver. In addition, to compensate for propagation loss, mmWave transmissions use highly directional antennas to focus signal power in a narrow beam. Since the resulting mmWave beam from such directional antennas is very narrow, communication glitches and interruptions occur whenever blockages occur, e.g., a human walking across such "pencil-beams." Such blockages can result in significant signal to noise ratio (SNR) drop, e.g., 20 dB. Both of these problems, short wavelengths and transmissions via narrow beams, are magnified when mmWaves are deployed inside, for example in a user's home, due to the increased presence of walls, humans, and other physical obstacles.

One inefficient solution is to deploy multiple mmWave access points (APs) in every room to guarantee LoS communication. However, this not only increases the cost of mmWave implementation, but also incurs huge complexity in coordinating a massive number of mmWave APs, especially in the presence of mobile obstacles, e.g., humans, pets, etc. Instead of simply increasing the number of endpoints of the wireless links and leaving the wireless channel itself unchanged, embodiments of the invention enable a smarter radio environment that electronically reconfigures itself to relay mmWave beams, avoid obstacles, and track receivers, amongst other functions.

Embodiments of the invention include a reconfigurable metasurface for mmWave networks, which may be referred to herein as "mmWall." One such embodiment is a tunable smart surface made of metamaterial that, unlike conventional wireless relay systems does not have transmitting and receiving antennas, nor an amplifier. Instead, when an incoming beam from a transmitter hits the metasurface, the metasurface naturally refracts the beam into a desired direction towards a receiver, regardless of where the transmitter is located, including in the same room ("mirror" mode) or in a different room ("lens" mode). Additionally, the metasurface can split the incoming beam into multiple beams and concurrently steer the multi-armed beams. These functionalities allow embodiments to (i) redirect mmWaves around and through obstacles that would otherwise block them, (ii) direct the directionally limited beams of mmWaves towards moving receivers, and (iii) track moving receivers, such as those on a device carried by a user. These functionalities enable the deployment and use of mmWave networks in indoor environments, despite their previous unsuitability.

An embodiment is directed to a system for transforming an incident high frequency wave comprising a plurality of meta-atom pairs coupled to define a surface. Each meta-atom pair of the plurality is comprised of a magnetic meta-atom and an electric meta-atom separated by a dielectric substrate, where the magnetic meta-atom and the electric meta-atom are configured to have a resonant frequency. Additionally, each meta-atom pair of the plurality is configured to generate an electro-magnetic response by interacting with an incident high frequency wave. According to an aspect, the generated electro-magnetic response is dependent on a voltage applied to each meta-atom pair. The generated electro-magnetic response is configured to transform the incident high frequency wave, having a frequency matching the resonant frequency, received at the defined surface into an emitted wave from the defined surface.

The emitted wave may be at least one of: a relay of the incident high frequency wave, a reflection of the incident high frequency wave from the defined surface, a transmission of the incident high frequency wave through the defined surface, a redirection of the incident high frequency wave, a phase shift of the incident high frequency wave, a frequency shift of the incident high frequency wave, and a focusing of the incident high frequency wave. The emitted wave can be a first emitted wave and the generated electro-magnetic response may be configured to transform the incident high frequency wave into the first emitted wave from the defined surface and a second emitted wave from the defined surface.

The magnetic meta-atom and the electric meta-atom may be circular and the resonant frequency may be dependent on a radius of the circular magnetic meta-atom and a radius of the circular electric meta-atom. In such embodiments, each radius may be less than 1.1 mm.

The voltage can be applied to each meta-atom pair using a control line, the control line may have a length and thickness that configure the control line to act as a choke at the resonant frequency.

The system can further include a processor, wherein the voltage applied is controlled by the processor and the processor is configured to modulate the voltage applied to modify properties of the generated electro-magnetic response and properties of the emitted wave. The processor can be configured to modulate the voltage applied over time to modify the properties of the generated electro-magnetic response and the properties of the emitted wave. The processor may be further configured to modulate the applied voltage over time to modify the properties of the generated electro-magnetic response and the properties of the emitted wave in real time.

The resonant frequency can be at least 20 GHz.

A method for transforming an incident high frequency wave includes receiving an incident high frequency wave at a surface defined by a plurality of meta-atom pairs coupled, wherein each meta-atom pair of the plurality is comprised of a magnetic meta-atom and an electric meta-atom separated by a dielectric substrate. The magnetic meta-atom and the electric meta-atom are configured to have a resonant frequency matching a frequency of the incident high frequency wave. The method also includes generating, by the plurality of meta-atom pairs interacting with the received incident high frequency wave, an electro-magnetic response and applying a voltage to the plurality meta-atom pairs. Said voltage is configured to modulate the generated electro-magnetic response. The method transforms, based on the modulated generated electro-magnetic response, the incident high frequency wave received at the surface into an emitted wave from the surface.

The emitted wave of the method can be at least one of: a relay of the incident high frequency wave, a reflection of the incident high frequency wave from the surface, a transmission of the incident high frequency wave through the surface, a redirection of the incident high frequency wave, a phase shift of the incident high frequency wave, a frequency shift of the incident high frequency wave, and a focusing of the incident high frequency wave. The emitted wave of the method may be a first emitted wave. In such an implementation, the method may further include, based on the modulated generated electro-magnetic response, transforming the incident high frequency wave into (i) the first emitted wave from the defined surface and (ii) a second emitted wave from the from the defined surface.

The magnetic meta-atom and the electric meta-atom used by the method may be circular and the resonant frequency may be dependent on a radius of the circular magnetic meta-atom and a radius of the circular electric meta-atom.

The incident high frequency wave may be a millimeter wave and, likewise, the resonant frequency can be a millimeter wave frequency. The incident high frequency wave can also be one of a 5G signal, a Wi-Fi signal, or a network backhaul signal.

The method may further comprise, if the incident wave is received from a network base station, performing a beam alignment between the surface and the base station. The method may further comprise, if the emitted wave is configured to be received by a user device, performing a beam alignment between the surface and the user device.

The method may also include controlling the voltage applied to the plurality of meta-atom pairs. Such control may be implemented via an user device that receives the emitted wave. The user device or other such device controlling the voltage can be communicatively coupled to the surface using any communication protocol known in the art, including at least one of: a Bluetooth connection, radio connection, Wi-Fi connection, or telecommunication connection.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 12A is a front cutaway illustration of the magnetic side of an embodiment with multiple boards installed.

FIG. 12B is a back cutaway illustration of the magnetic side of an embodiment with multiple boards installed.

FIG. 12C is a front cutaway illustration of the electrical side of an embodiment with multiple boards installed.

FIG. 12D is a back cutaway illustration of the electrical side of an embodiment with multiple boards installed.

FIG. 13A is an illustration of the electric side of a board utilized in embodiments.

FIG. 13B is an illustration of the magnetic side of a board utilized in embodiments.

FIG. 14A is a close up view of an electric meta-atom and surrounding area of the electrical side of a board according to an embodiment of the invention.

FIG. 14B is a close up view of a magnetic meta-atom and surrounding area of the magnetic side of a board according to an embodiment of the invention.

FIG. 15A is an illustration of the electric side of an example board utilized in embodiments.

FIG. 15B is an illustration of the magnetic side of an example board utilized in embodiments.

FIG. 18A is a photograph of the magnetic side of a section of an embodiment of a metamaterial surface with a shared ground control line.

FIG. 18B is a photograph of the electric side of a section of an embodiment of a metamaterial surface with a shared ground control line.

FIG. 18C is a photograph of the magnetic side of a section of an embodiment of a metamaterial surface with separate ground control lines.

FIG. 18D is a photograph of the electric side of a section of an embodiment of a metamaterial surface with separate ground control lines.

FIG. 20A is an illustration of a network downlink initialization using a mmWall.

FIG. 20B is an illustration of a network uplink initialization using a mmWall.

FIG. 20C is an illustration of a network with beam tracking between a mmWall and a user.

FIG. 20D is an illustration of a network with angular reciprocity using a mmWall.

DETAILED DESCRIPTION

A description of example embodiments follows.

Embodiments of the invention harness advances in artificially engineered metamaterials to create a smart metasurface (which may be referred to herein as mmWall) to improve transmission in millimeter wave (mmWave) networks. Embodiments can provide a fast millimeter wave (mmWave) beam relay through, or reflection from, the mmWall and redirect the beam power in another direction when, for non-limiting example, a human body blocks a line-of-sight (LoS) path between a transmitter and receiver.

FIGS. 1A-1D are schematic illustrations of a network with and without embodiments to show use cases of embodiments of the invention. Each of FIGS. 1A-D show a room 100a-d, respectively, divided by a wall 101a-d, respectively, without a smart surface according to an embodiment. Further, FIGS. 1A-D each show a room 110a-d divided by a wall 113a-d with a smart surface embodiment 105a-d. Each room 100a-d has a transmission source 102a-d and receiver(s) 103a, 103b, 103c, 103d, and 103e. Likewise, each room 110a-d has a transmission source 107a-d and receiver(s) 108a, 108b, 108c, 108d and 108e. Example transmission sources 102a-d and 107a-d include wireless routers and example receivers 103a-d and 108a-d include user devices such as smart phones. The transmission sources, or transmitters, 102a-d emit data carrying electromagnetic waves 104a, 104b, 104c, and 104d to the receivers 103a, 103b, 103c, 103d and 103e. Similarly, the transmitters 107a-d emit data carrying electromagnetic waves 109a, 109b, 109c, and 109d to the receivers 108a, 108b, 108c, and 108d and 108e. In the rooms 100a-d that lack a smart surface, e.g., 105a-d, the power of the waves 104a, 104b, 104c, and 104d attenuates as they traverse the walls 101a-d and their width widens. This interferes with, reduces, and can even prevent entirely the reception of the waves 104a, 104b, 104c, and 104d by receivers 103a, 103b, 103c, 103d and 103e and the loss of the data/information carried by the waves 104a, 104b, 104c, and 104d. The negative effects of walls 101a-d are magnified if the waves 104a, 104b, 104c, and 104d are a mmWave due to their high wavelength and difficulties refracting around objects.

Figure 1A:
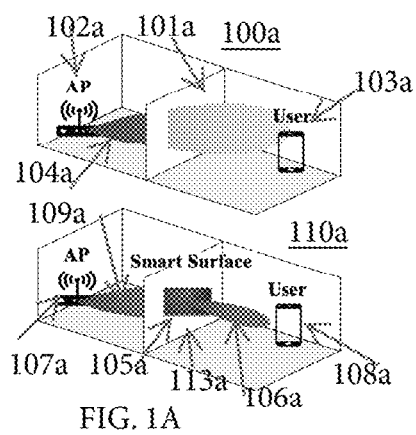
FIGS. 1A-1D are schematic illustrations of a network with and without the incorporation of embodiments of the invention.

FIG. 1A shows the relaying and focusing ability of smart surface 105a enabled by embodiments of the invention. To counteract the attenuation caused wall 101a and widening caused by the traveling of wave 104a as depicted in the room 100a, wall 113a with smart surface 105a is able to transform wave 109a, when it hits the smart surface 105a, into wave 106a. Wave 106a is relayed and focused towards the receiver 108a, reducing, if not eliminating any attenuation improving signal strength and data transfer. Therefore, by counteracting object attenuation, smart surface 105a, for example a mmWall, is able to overcome one of the primary difficulties in adapting mmWave transmissions to indoor network use. Because smart surface 105a is able to relay in 360 degrees, if receiver 108a is on the same side of the wall 113a with smart surface 105a as transmitter 107a, smart surface 105a can relay and focus wave 106a away from the wall 113a instead of, as shown in FIG. 1A, transmitting it through wall 113a.

Figure 1B:
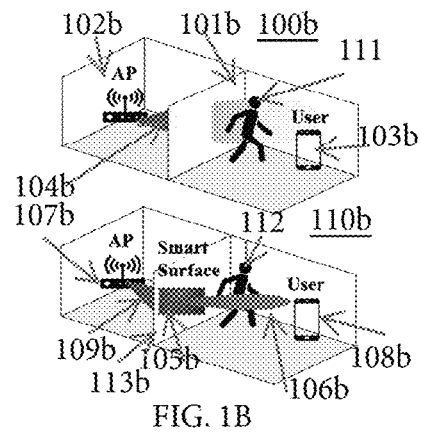

FIG. 1B shows the path diversity ability of smart surface 105b enabled by embodiments of the invention. In room 100b of FIG. 1B transmitter 102b and receiver 103b are separated by wall 101b which interferes with wave 104b. In addition, a mobile object 111 is also present in room 100b introducing further interference. A mobile object 112 is also located in room 110b and is able to attenuate wave 106b. The positioning of mobile objects 111, 112 can change altering the optimal path, with the least interference, between transmitters 102b, 107b and receivers 103b, 108b, respectively. In room 110b, smart surface 105b, for example a mmWall, is able to provide path diversity by receiving wave 109b and, in turn, issuing transformed wave 106b from different points on its surface. As explained hereinabove in regard to FIG. 1A, the transformed wave 106b does not suffer attenuation from transmitting through the wall 113b and may be focused to counteract the spreading of wave 109b. In addition, because smart surface 105b enables the receipt of wave 109b and transmissions of transformed wave 106b across its surface, it provides a diversity of paths between transmitter 107b and receiver 108b. This enables the optimal path to be selected that avoids objects, such as mobile object 112, between transmitter 107b and smart surface 105b and smart surface 105b and receiver 108b. The path utilized by wave 109b and wave 106b can be altered in real time as mobile object 112 and/or other objects are introduced, removed, or moved within room 110b. This enables the network to use smart surface 105b to adopt the best path between transmitter 107b and receiver 108b in a changing environment of the room 110b, such as indoor network use.

Figure 1C:
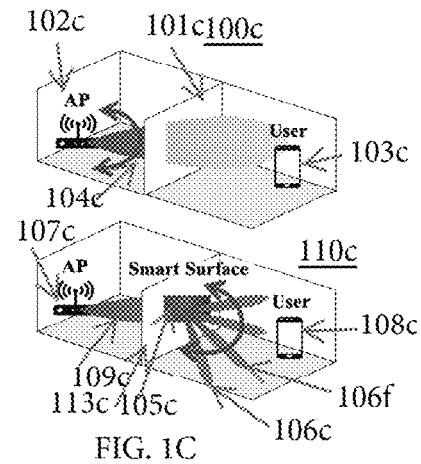

FIG. 1C shows the beam searching ability of smart surface 105c enabled by embodiments of the invention. In addition to the attenuation issues, when room 100c lacks a smart surface 105c it is inefficient at searching for and finding receiver 103c. As receiver 103c can be a mobile device, such as a smart phone, its location may be unknown by the network and transmitter 102c. Therefore, before data is sent from transmitter 102c to receiver 103c the location of receiver 103c must be determined. Without smart surface 105c on wall 113c, transmitter 102c must scan wave 104c over room 100c to find receiver 103c. However, in room 110c, smart surface 105c provides a significant improvement on the efficiency of finding receiver 108c. Smart surface 105c, for example a mmWall, is able to split incident wave 109c and transform it into multiple waves, e.g. 106c and 106g. Each transformed wave 106c, 106f can scan and search for receiver 108c independently and simultaneously. This enables faster probing for and location of receiver 108c as well as the determination of the optimal transmission path between transmitter 107c and receiver 108c.

Figure 1D:
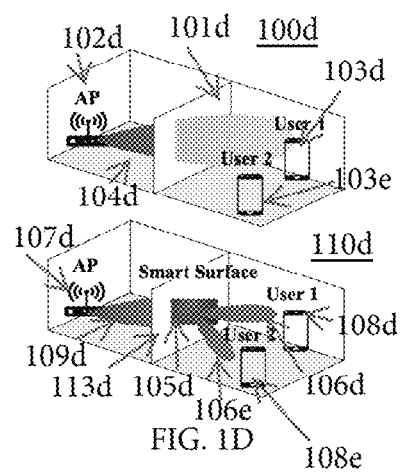

FIG. 1D shows the multicast ability of smart surface 105d enabled by embodiments of the invention. When room 100d lacks a smart surface 105d it has difficulties, or may even be incapable, in transmitting wave 104d from a single transmitter 102d to multiple receivers 108d and 108e. This issue is increased when using mmWaves due to their increased directionality. In room 110d, smart surface 105d on wall 113d, for example a mmWall, is able to split wave 109d and transform it into multiple waves 106d, 106e. Each transformed wave 106d, 106e can be directed to a different receiver 108d and 108e. This supports simultaneous multiple users.

Figure 2:
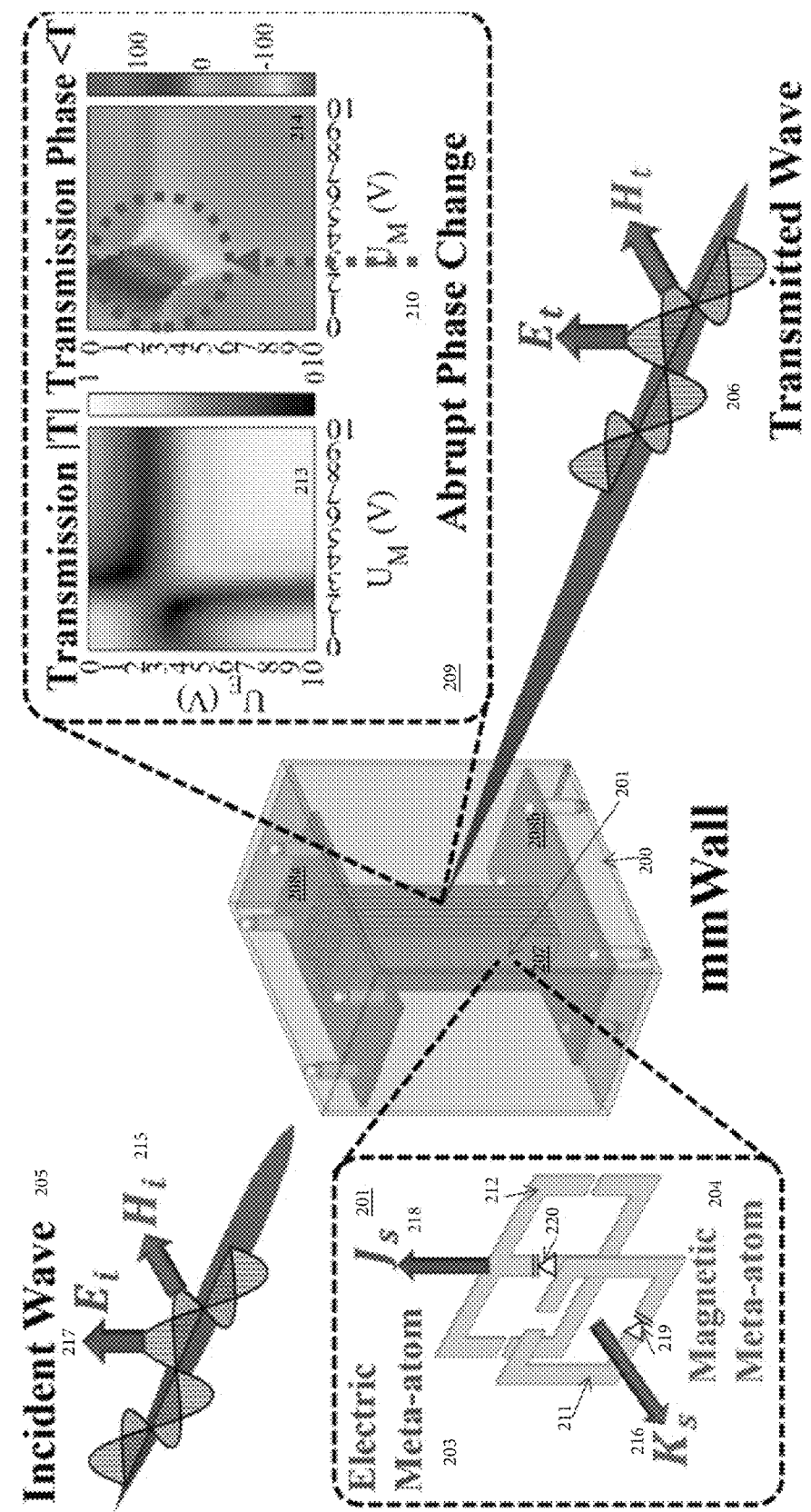
FIG. 2 is a diagram of a Huygen's metasurface, utilized in existing technologies.

FIG. 2 is a cutaway diagram of a Huygens' metasurface section 200, utilized in existing technologies. Section 200 is composed of a set of parallel circuit boards 207 attached to supports 208a-b. The circuit boards 207 each include sets of meta-atoms 201. Each meta-atom 201 is composed of a magnetic meta-atom 204 and electric meta-atom 203 pair. The magnetic meta-atoms 204 and electric meta-atoms 203 are each on different sides of, and separated by individual circuit boards 207. The meta-atoms 201 create a field discontinuity, sustained by electric and magnetic current densities ($\vec{J}_S$, $\vec{K}_S$) induced by the electric 203 and magnetic 204 meta-atoms. Based on the properties of the created field discontinuity, an incident electromagnetic wave 205 is transformed into transmitted electromagnetic wave 206 when it hits the section 200 of the metasurface. The properties, such as the direction, magnitude, phase and even number of transmitted waves 206 can be controlled by altering the current densities ($\vec{J}_S$, $\vec{K}_S$). The current densities ($\vec{J}_S$, $\vec{K}_S$) can be dependent on the voltage $U_E U_M$ applied to the electric 203 and magnetic 204 meta-atoms respectively. Circuits on circuit boards 207 are used to supply voltage $U_E U_M$ and control current densities $\vec{J}_S$, $\vec{K}_S$ and therefore, the resulting field discontinuity. Voltage $U_E U_M$ may be applied to varactors 219 and 220 on electric 203 and magnetic 204 meta-atoms. Insert 209 shows the Huygen's pattern with varying voltage, specifically, the effect on transmission in heat map 213 and transmission phase in heat map 214 of transmitted wave 206 for a range of voltages $U_E U_M$. Area 210 identifies a location within the Huygen's pattern where small changes in voltages $U_E U_M$ results in abrupt phase changes of transmission wave 206. In these ranges, the smart surface composed of sections 200, can have precise and significant control over the properties of transmission wave 206 with minimal voltage variation. Embodiments of the invention may be implemented using a modified version of the Huygens' metasurface shown in FIG. 2 that is updated to enable use with mmWave transmissions as incident wave 205 and transmitted wave 206.

A more detailed description of Huygens' metasurfaces 200 and their component meta-atom pairs 201 follows. Huygens' metasurfaces (HMSs) comprise a layer of co-located orthogonal electric 203 and magnetic 204 meta-atoms, facing each other across dielectric substrate (circuit board 207). This meta-atom pair 201 introduces a discontinuity in the electromagnetic fields and, hence, provides the means for manipulation of all attributes of the incident field or wave 205, including its magnitude and phase, to produce the transmitted wave 206 with desired properties. Specifically, as the incident wave 205 ($\vec{E}_i$, $\vec{H}_i$) passes through the magnetic meta-atom 204, the magnetic field $\vec{H}_i$ 215 of the incident wave 205 induces the rotating current within the metallic loop 211 of the magnetic metaatom 204 that in turn produces its own magnetic field $\vec{K}_S$, 216, which enhances or opposes the incident field/wave 205. Similarly, the metallic loop 212 of electric meta-atom 203 is excited by the electric field $\vec{E}_i$ 217 of the incident wave 205, resulting in the oscillating current loops that create their own electric response $\vec{J}_S$ 218. When these electric and magnetic responses 216 and 218 of the Huygens' meta-atom pair 201 interact with the fields of the incident wave 205, it creates an abrupt phase shift transforming it into transmitted wave 206. Hence, by controlling the electric and magnetic responses ($\vec{J}_S$, $\vec{K}_S$) 216 and 218, Huygens' metasurface 200 steers the incoming wave 205 to a desired direction by transforming it into and controlling the properties of transmitted wave 206.

Figure 3:
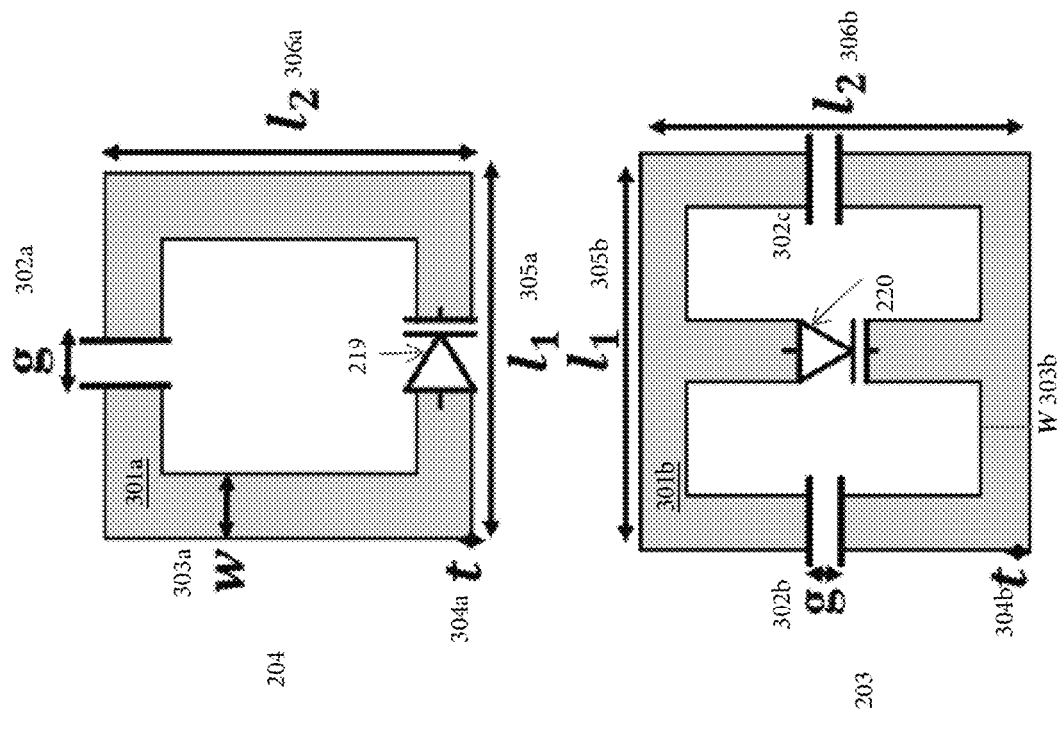
FIG. 3 is a diagram of the design parameters of an existing Huygen's meta-atom pair.

FIG. 3 is a diagram of the design parameters of a Huygens' meta-atom pair. To induce the magnetic or electric response, e.g., 216 and 218, the magnetic 204 and electric 203 meta-atom each act as a resonant LC (resonant) circuit, consisting of an inductor L and a capacitor C. Each meta-atom 204 and 203 also includes varactors 219 and 220 to which voltage is applied. The gap(s) 302a, 302b, 302c of a metallic loop 301a, 301b induces a capacitance while the metallic loop 301a, 301b itself generates an inductance. The equation for the gap 302a, 302b, 302c capacitance can be simplified as $C=\epsilon_0 wt/g$ where $\epsilon_0$ is free-space permittivity while the length of the gap 302a, 302b, 302c is g, the width 303a, 303b of the metallic loop 301a, 301b is w, and the thickness 304a, 304b of the metallic loop 301a, 301b is t. The equation for the inductance of metallic loop 301a, 301b can be simplified as $L=u_0 l_1 l_2/t$ where $u_0$ is free-space permeability and $l_1$ and $l_2$ are the dimensions 305a, 305b, 306a, 306b of the metallic loops 301a, 301b of meta-atom 203, 204. Each HMS is engineered to oscillate at a resonant frequency, $f_0$. The resonant frequency corresponds to the frequency of the incident wave 205 that best induces the electric and magnetic responses ($\vec{J}_S$, $\vec{K}_S$) in meta atoms 203, 204. Incident waves 205 with a frequency sufficiently removed from the resonant frequency will not induce sufficient electric and magnetic responses ($\vec{J}_S$, $\vec{K}_S$) to generate the field discontinuity that enables (i) the transformation of incident wave 205 into transmitted wave 206 and (ii) the controlling of the properties of transmitted wave 206.

The resonant frequency of a HMS is correlated to the capacitance and inductance of its meta-atoms 203, 204, $f_0 = 1/(2\pi\sqrt{LC})$. By controlling the LC value of the meta-atoms, a HMS can be designed for a desired resonant frequency, for example within the mmWave spectrum. The LC value of a circuit with one gap capacitor and one inductor (i.e. a magnetic meta-atom 204) is the product of the following generalized equation:

$$LC = \left(\frac{u_0 A}{t}\right) * \left(\frac{\epsilon_0 wt}{g}\right) = \left(\frac{1}{c_{light}^2}\right) * \left(\frac{Aw}{g}\right)$$

Equation 1 where $C_{light}$ is the speed of light and A is the area of meta-atom 203, 204 which is equivalent to $l_1 l_2$. A similar LC can also be derived for an electrical meta-atom 203 with two gap capacitors 302b and 302c. A person skilled in the art would know that the LC value of a circuit on meta atoms 203, 204 can be determined for a range of gap locations, numbers, and configurations as well as for a range values of physical properties w, t, $l_1$ and $l_2$. To render HMS reconfigurable, tunable electrical components, such as varactors 219 and 220 or p-i-n diodes, are added to the meta-atoms 203, 204 so that a metasurface element can be tuned through voltage bias lines connecting to the tunable electrical components.

Figure 4:
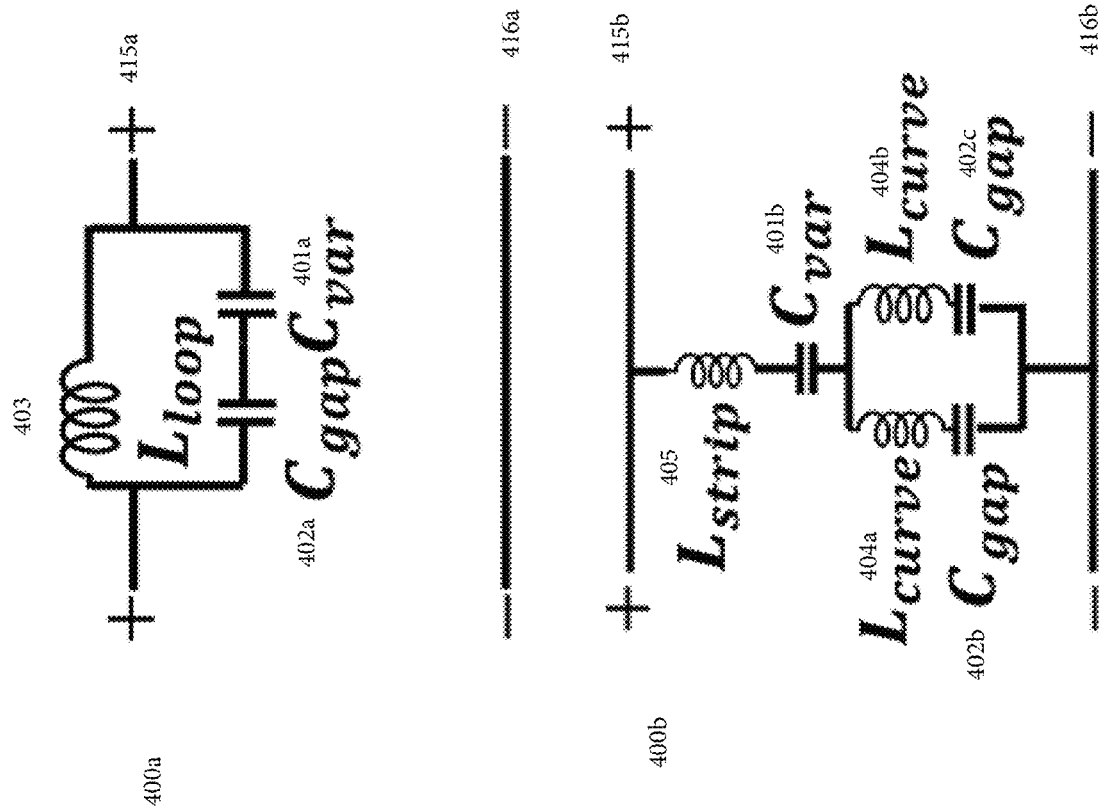
FIG. 4 is a circuit diagram of an electrical meta-atom and a magnetic meta-atom of a Huygens' metasurface.

FIG. 4 is a circuit diagram 400a, 400b of the electrical and magnetic meta-atoms of a Huygens' metasurface. The top diagram is a circuit diagram 400a that may indicate the operation of an existing magnetic meta-atom, e.g., 204, and a magnetic meta-atom 504. The bottom diagram is a circuit diagram 400b that may indicate the operation of existing an electrical meta-atom, e.g., 203 and an electrical meta-atom 503. Embodiments of the invention utilize electrical, 503 and magnetic 504 meta-atoms with the circuits 400a, 400b shown in FIG. 4. Circuits 400a, 400b include capacitors as a voltage-controlled capacitor, labeled as $C_{var}$ 401a and 401b in FIG. 4. The varactor capacitors $C_{var}$ 401a, 401b form a series circuit with the gap capacitors 402a, 402b, 402c labeled as $C_{gap}$ in FIG. 4. The total capacitance can be written as $C_{total}=1/(C_{gap}+C_{var})$. Hence, by applying voltages, e.g. $U_E U_M$, across the varactor capacitor 401a, 401b $C_{var}$, the LC value and therefore the resonance frequency can be slightly shifted from the designed frequency from $f_{target}=1/(2\pi\sqrt{LC_{gap}})$ to $f_{new}=1/(2\pi\sqrt{LC_{total}})$. Inductor elements of the metallic loops 301a, 301b such as $L_{loop}$ 403 in the magnetic 204 meta-atom circuit and $L_{strip}$ 405 and $L_{curve}$ 404a and 404b in the electric 203 meta-atom circuit add the inductance of the LC circuit. If the capacitance is variable due to $C_{var}$ 401a, 401b and controllable, the inductance can remain constant. Control lines 415a, 415b (e.g. positive voltage) and 416a, 416b (e.g. negative voltage or ground) can be used to supply voltage to the $C_{var}$ 401a, 401b, changing $C_{total}$ and controlling the $f_{target}$ value.

Referring to FIG. 2, the heat map graphs 213 and 214 of insert 209 show the amplitude of the transmission coefficient |T| and phase of the transmission coefficient <T of an incident wave 205 with frequency $f_{target}$ and with varying voltage $U_E$ and $U_M$ applied to the varactor capacitors $C_{var}$ 220 and 219, of electric 203 and magnetic 204 meta-atoms, respectively. This heat map pattern is called a Huygens' pattern, and it has a full transmission-phase coverage of 360 degrees with a high amplitude.

Embodiments of the invention include a mmWall that is a programable metasurface that operates at mmWave frequency, fully controls the direction of the transmitted mmWave beam, and is able to split the relayed mmWave beam into multiple directions. However, existing Huygens' metasurface and meta-atoms, e.g., section 200 implemented with meta-atom pairs 201 of electric 203 and magnetic 204 meta-atoms, cannot be used with mmWave frequency waves. For embodiments to be effective at mmWave frequencies, meta-atoms are needed that have a targeting resonant frequency $f_{target}$ that matches the mmWave frequency of approximately 24 GHz. Given equation 1, the target frequency can be increased to 24 GHz by decreasing the area $A=l_1 l_2$, ring width w, and/or increasing the gap size g. The most direct solution is to directly scale down the size of the meta-atom 203, 204 designs, such that $l_1$ and $l_2$ equals $\lambda/10$, which is the standard meta-atom 203, 204 size ratio. At mmWave frequency and corresponding wavelengths, a meta-atom 203, 204 with $\lambda/10$ is too small such that once the smallest-available varactor 219, 220 is loaded, its packaging completely distorts the tailored electromagnetic surface properties of the meta-atoms 203, 204.

Figure 5A:
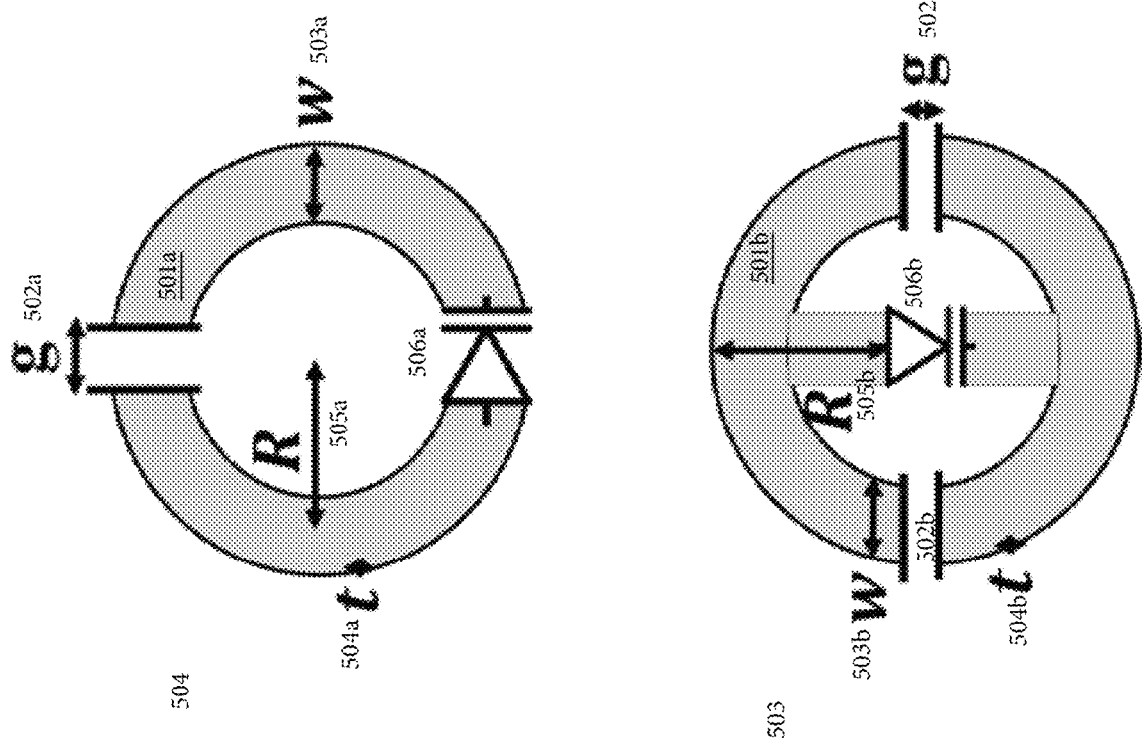
FIG. 5A is a diagram of a novel circular meta-atom design used by embodiments of the invention.

As such, embodiments utilize a novel circular meta-atom design depicted in FIG. 5A. To solve the issues of using existing meta-atoms, embodiments use meta-atoms 503 and 504 where the areas A of the metallic loops 501a, 501b are reduced by changing the rectangular meta-atom 203,204 design into the circular design 503, 504 with radii 505a, 505b, $R=l_1/2=l_2/2$. Circular electric 503 and magnetic 504 meta-atoms can operate in accordance with the circuits diagramed in FIG. 4. To load the varactor ($C_{var}$) 506a and 506b onto circular electric 503 and magnetic 504 meta-atoms, $l_1$ and $l_2$ are fixed to twice the size of the varactors 506a and 506b, breaking the standard $\lambda/10$ convention. With the new meta-atom designs 503, 504 the area A is reduced by a factor of $\pi/4$ compared to the rectangular standard designs 203, 204 shown in FIG. 3, which in turn lowers the inductance L and increases the resonant frequency, given the resonant frequency equation. Other geometric features such as width 503a, 503b w and gap 502a, 502b, 502c g and thickness 504a, 504b can be fine-tuned until the targeting frequency $f_{target}=1/(2\pi\sqrt{LC_{gap}})$ reaches 24 GHz. Once $f_{target}$ matches mmWave frequency, a metasurface, composed of pairs of novel meta-atoms 503, 504 can be constructed that is able to receive, transform, and emit mmWaves.

An in-depth analysis of a Huygen's metasurface and meta-atom pairs that operate at mmWave frequency follows. In Huygen's metasurface, the magnetic and electric metaatom each act as a resonant LC circuit, a circuit consisting of an inductor L and a capacitor C. FIG. 5A shows the design parameters of a novel meta-atom design utilized by embodiments of the invention. The gap, e.g., 502*a-c* of a metallic loop, e.g., 501*a* and 501*b*, induces a capacitance while the metallic loop itself generates an inductance.

Magnetic Meta-atom—The inductance and capacitance of the magnetic meta-atom 504 can be calculated as follows:

$$L_{circle} = \mu_0 R_m \left( \log\left( \frac{8R_m}{t+w} - \frac{1}{2} \right) \right)$$

where $R_m$ is the mean radius 505*a* of magnetic meta-atom 504 and $\mu_0$ is free-space permeability. Since there is a gap 502*a* at the top of metallic loop 501*a*, the actual inductance of the magnetic meta-atom 504 is:

$$L_{total} = p_m L_{circle} = \left(1 - \frac{g}{2\pi R_m}\right) L_{circle}$$

where g is the length of the gap 502*a*.

The gap 502*a* creates a parallel-plate capacitance as follows:

$$C_{gap} = \epsilon \frac{wt}{g} + \epsilon(t + w + g)$$

where w is the width 503*a* of the loop 501*a*, and $t$ is the thickness 504*a* of the loop. Here $\epsilon = \epsilon_0 \epsilon_{\it eff}$ where $\epsilon_0$ is the free-space permittivity, and $\epsilon_{\it eff}$ is the effective permittivity. Additional capacitance can be introduced by the metallic ring 501*a* itself and can be written as:

$$C_{surf} = \frac{2\epsilon(t+w)}{\pi} \ln\left(\frac{4R_m}{g}\right).$$

Lastly, the varactor diode 506*a* also adds to the capacitance of magnetic meta-atom 504 based on applied voltage. Specifically, as voltage is applied to the varactor diode 506*a*, the varactor capacitance $C_{var}$ decreases. Therefore, the total capacitance of the meta-atom 504 is calculated as follows:

$$C_{total} = \frac{1}{\frac{1}{C_{gap} + C_{surf}} + \frac{1}{C_{var}}}$$

Electric Meta-atom. Unlike the magnetic meta-atom 504, the inductance of the metallic ring 501*b* of the electric meta-atom 503 needs to be divided into three regions: two half-circle rings and a strip on the middle. This is because the current flows into different directions for these three regions, whereas in the magnetic meta-atom 504, the current flows in a single direction. The circuit diagram 400*b*, shows these three regions, $L_{curve}$ 404*a*, 404*b* and $L_{strip}$ 405. The inductance of the electric meta-atom 503 is calculated as follows:

$$L_{curve} = \frac{p_e L_{circle}}{2} = \frac{\left(1 - \frac{g}{2\pi R_m}\right) L_{circle}}{2}$$

$$L_{strip} = \frac{\mu_0 l}{4\pi}\left[ 2\sinh^{-1}\left(\frac{l}{w}\right) + 2\left(\frac{1}{w}\right)\sinh^{-1}\left(\frac{w}{l}\right) - \frac{\frac{2}{3}(w^2 + l^2)^{1.5}}{lw^2} + \frac{2}{3}\left(\frac{l}{w}\right)^2 + \frac{2}{3}\left(\frac{w}{l}\right) \right]$$

Where l is the length of the strip, which is equivalent to $2R_m$ (radius 505*b*), and w is the width 503*b* of the loop 501*b*. As depicted in FIG. 4, two $L_{curve}$ are in parallel while $L_{strip}$ is in series. Therefore, the total inductance for electric meta-atom 503 is written as:

$$L_{total} = \frac{L_{curve}}{2} + L_{strip}$$

The formulas for the gap capacitance and surface capacitance for the electric meta-atom 503 are the same as those for the magnetic meta-atom 504 detailed above. However, the there are two gaps 502*b*, 502*c* in the electric meta-atom 503 in parallel. Thus, with the varactor 506*b* capacitance, $C_{var}$, in series, the total capacitance is written as:

$$C_{total} = \frac{1}{\frac{1}{2(C_{gap} + C_{surf})} + \frac{1}{C_{var}}}$$

Finally, using the total capacitance and inductance, the resonant frequency of the two meta-atoms is calculated as follows:

$$f_0 = \frac{1}{2\pi\sqrt{L_{total}C_{total}}}$$

To make the mmWall or Huygen's meta surface composed of meta-atoms 503, 504 reconfigurable, tunable electrical components, such as varactors 506*a*, 506*b* and/or p-ipn diodes are added to each meta-atom 503, 504 so a user can tune a meta surface element by applying different voltages. Some embodiments, use a varactor as a voltage-controlled capacitor. As seen in the circuit diagrams 400*a*, 400*b* of FIG. 4 and the meta-atom designs of FIG. 5A, the voltage varactor capacitor 401*a*, 401*b*, 506*a*, 506*b*, $C_{car}$ forms a series circuit with one or more gap capacitor 402*a*, 402*b*, 402*c* $C_{gap}$. By applying voltage U to a varactor 401*a*, 401*b*, 506*a*, 506*b* on each meta-atom 503, 504, the resonant frequency can be slightly shifted $f=1/(2\pi\sqrt{LC_{U>0}})$ and therefore provide different transmission phases at the original frequency $f_0=1/(2\pi\sqrt{LC_{U=0}})$.

Figure 5B:
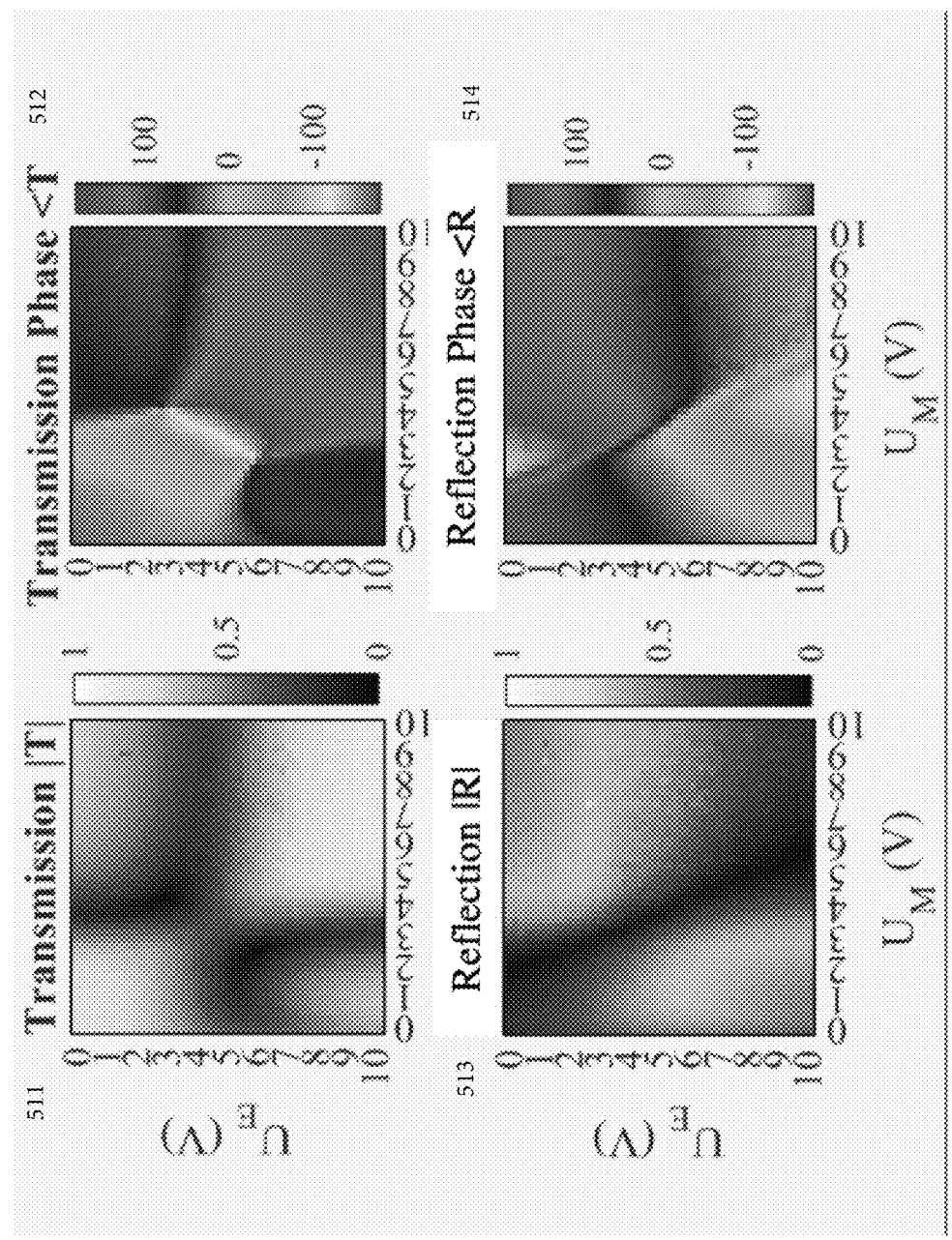
FIG. 5B is an illustration of the Huygen's pattern for the novel meta-atom designs used by an embodiment of the invention.

FIG. 5B is an illustration of the Huygen's pattern for the novel meta-atom designs 503, 504 used by an embodiment of the invention. The Huygen's pattern consists of four heat maps 511, 512, 513, 514 for varying voltages ($U_E$, $U_M$). $U_E$ is the voltage applied to the electric meta-atom 503 changing the $C_{var}$ of varactor 506*b*. $U_M$ is the voltage applied to the magnetic meta-atom 504 changing the $C_{var}$ of varactor 506*a*. Heat map 511 shows the effect of the applied voltages on the transmission amplitude of an incident wave. Heat map 513 shows the effect of the applied voltages on the reflection amplitude of an incident wave. Heat map 512 shows the effect of the applied voltages on the transmission phase of an incident wave. Heat map 514 shows the effect of the applied voltages on the reflection phase of an incident wave. The Huygen's patterns in FIG. 5B show that the meta-atoms 503, 504 have a full transmission-phase coverage of 360 degrees with a high amplitude.

Figure 5C:
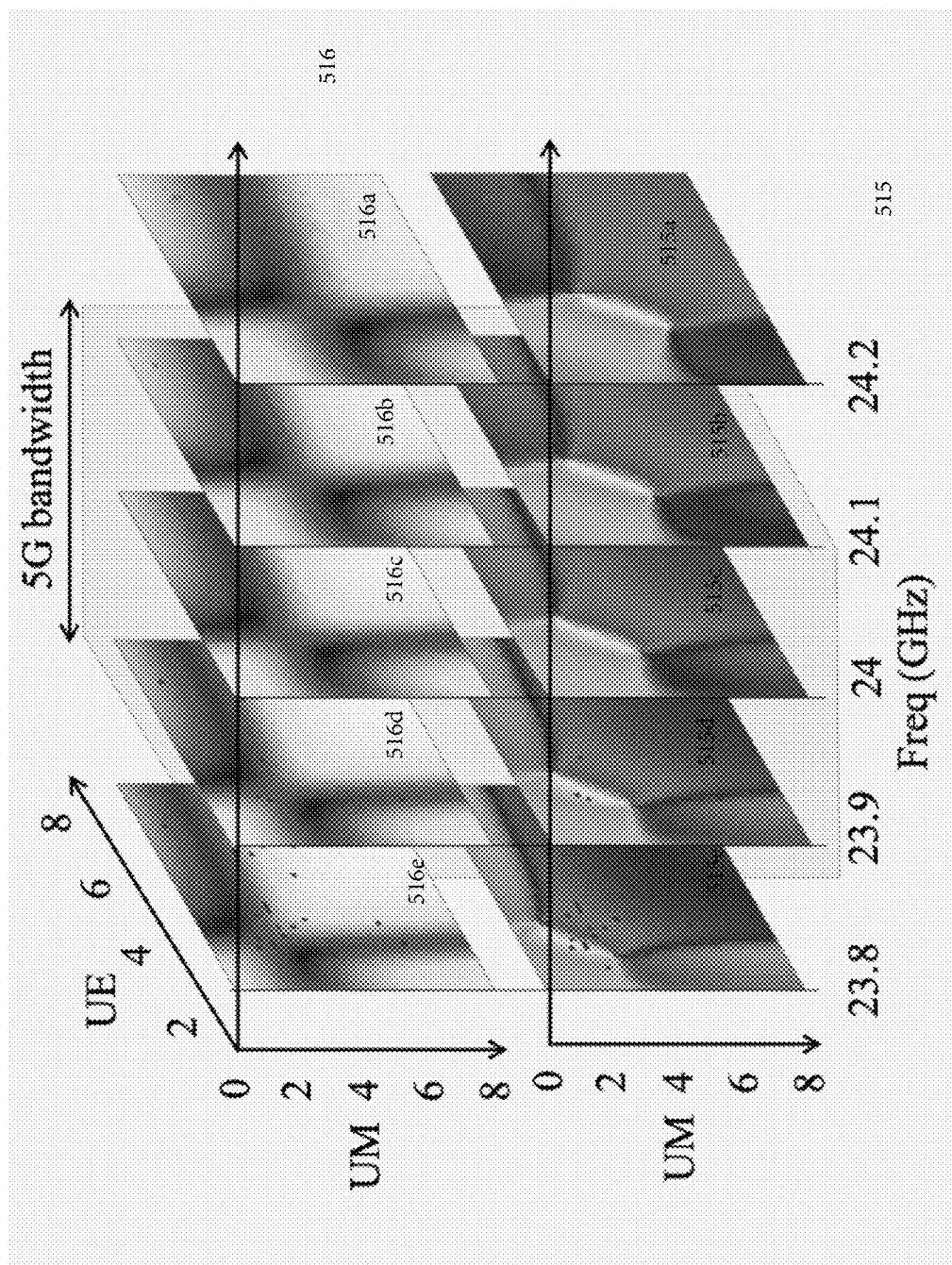
FIG. 5C is an illustration of a series of Huygen's patterns for the novel meta-atom designs used by an embodiment of the invention across different frequencies.

FIG. 5C is an illustration of a series of Huygen's patterns 515, 516 for the novel meta-atom designs 503, 504 used by an embodiment of the invention across different frequencies. FIG. 5C shows the transmission amplitude heat maps 515a-e and transmission phase heat maps 516a-e over a range of frequencies including those in the 5G bandwidth. FIG. 5C shows that the Huygen's patterns 515, 516 do not vary much within 5G's 200 MHz bandwidth.

Existing conventional phased array antennas calculate the total field pattern by multiplying the element factor (a pattern produced by a single element) to the array factor, (a pattern produced by an array of elements). Consider an array of n identical antennas with d spacing and amplitude a. The array factor is:

$$AF = a + ae^{jkd}(\cos\theta) + \ldots + ae^{jk(N-1)d(\cos\theta)} = a\Sigma_{n=0}^{N-1} e^{jknd(\cos\theta)} \quad \text{Equation 2}$$

where $k=2\pi/\lambda$ with $\lambda$ as the wavelength of the operating frequency and $\theta$ is the steering angle. As seen in Equation 2, the phase shift of each element is different. More specifically, the phase of the $n^{th}$ element is larger than the phase of element n−1 by $kd(\cos\theta)$, since the path length to the $n^{th}$ element is $d(\cos\theta)$ longer than $(n-1)^{th}$ element. Consequently, to steer the beam towards a particular direction, the phased array antenna must apply different phases for each array element, and the larger the phase difference is, the greater the phased array antenna steers.

Similarly, the mmWall of embodiments of the invention, applies a different phase shift at each meta-atom pair to steer incident waves and transform incident waves to transmitted wave(s) 106. Specifically, the mmWall leverages a full 360-degree transmission-phase coverage of HMS to provide different phase shifts.

Figure 6B:
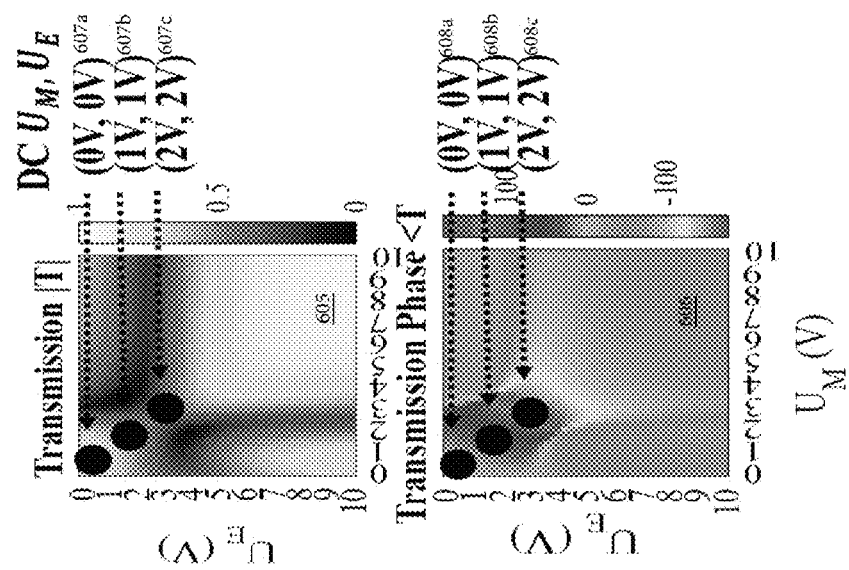
FIG. 6B is the Huygens' pattern for the embodiment shown in FIG. 6A.
Figure 6A:
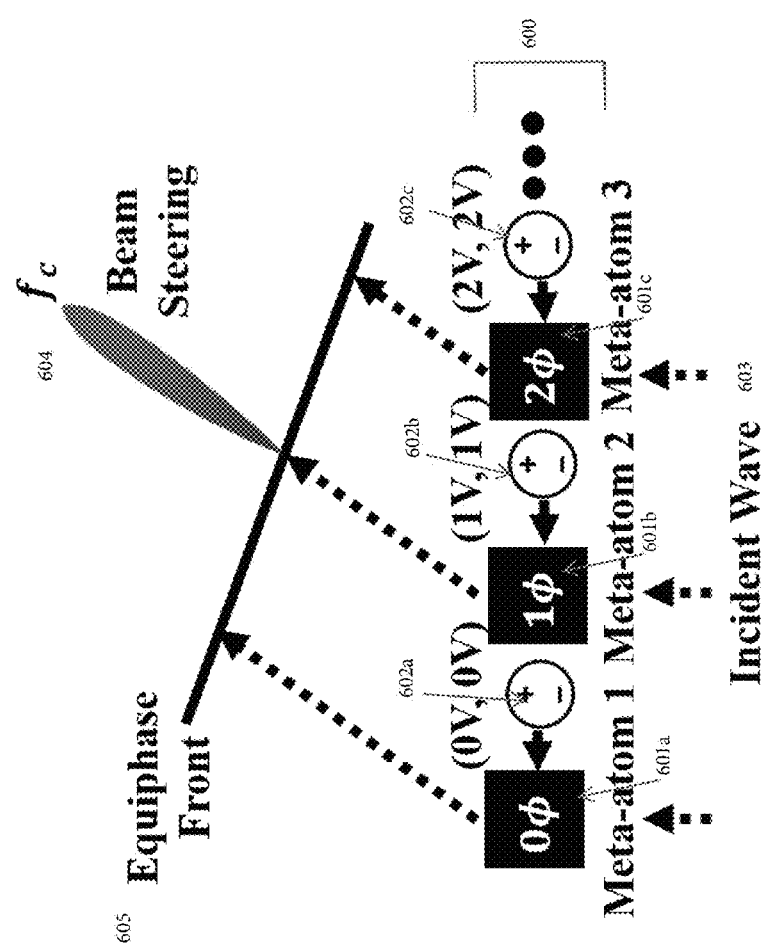
FIG. 6A is a schematic illustration of beam control using an embodiment of the invention.

FIG. 6A is a schematic illustration of beam control using a mmWall 600, according to an embodiment of the invention. A section of a mmWall 600 is comprised of three stacked meta-atom pairs 601a, 601b, and 601c. The meta-atom pairs 601a, 601b, and 601c have voltages $U_E$ and $U_M$ applied by control lines 602a, 602b, and 602c attached to voltage sources. The mmWall 600 receives incident wave 603 at the location of the three stacked meta-atom pairs 601a, 601b, and 601c that transform incident wave 603 into emitted wave 604. The properties of emitted wave 604, including its direction, are controlled by voltages $U_E$ and $U_M$ (0V, 0V; 1V, 1V; and 2V,2V) applied by control lines 602a, 602b, and 602c.

FIG. 6B is the Huygens' pattern for the section of mmWall wall 600 shown in FIG. 6A. Graph 605 is a heat map of the amplitude of the transmission coefficient |T| and graph 606 is a heat map of the phase of the transmission coefficient <T for transmitted wave 604. For the first meta-atom pair 601a, 0V is applied to the magnetic meta-atom, e.g., 505 and 0V is applied to the electric meta-atom, e.g., 503, such that $(U_E, U_M)=(0V, 0V)$. This is marked on graph 605 and graph 606 as points 607a and 608a. The first meta-atom pair 601a provides a transmission phase of $\phi$, with a high transmission-amplitude $a_0$. For the second meta-atom pair 602b, 1V is applied to both meta-atoms resulting in a different phase shift, $2\phi$, with a high transmission amplitude $a_1$, marked on graph 605 and graph 606 as points 607b and 608b. For the third meta-atom pair 602c, 2V is applied to both meta-atoms resulting in a different phase shift, $3\phi$, with a high transmission amplitude $a_2$, marked on graph 605 and graph 606 as points 607c and 608c. The array factor of mmWall 600 can be formulated as follows:

$$AF = a + a_1 e^{j\phi} + \ldots + a_n e^{j(N-1)\phi} \approx a\Sigma_{n=0}^{N-1} e^{jn\phi} \quad \text{Equation 3}$$

Equation 3 corresponds to equation 2 and therefore, incident wave/beam 603 can be steered and transformed into transmitted wave 604 by varying voltages ($U_E$, $U_M$). Furthermore, while conventional existing relay systems require two phase antenna arrays, one to receive the incoming signal and another to transmit a new signal with a time delay, the mmWall 600 only needs a single array of the meta-atom pairs 601a-c as it directly shifts the phase of the existing incident signal 603.

FIG. 7A is a schematic illustration of beam control using a mmWall, according to an embodiment of the invention. A section of a mmWall 700 is comprised of three stacked meta-atom pairs 701a, 701b, and 701c. The meta-atom pairs 701a, 701b, and 701c have varying voltages $U_E$ and $U_M$ applied by control lines 702a, 702b, and 702c attached to voltage sources. The mmWall 700 receives incident wave 703 at the location of the three stacked meta-atom pairs 701a, 701b, and 701c and transform incident wave 703 into emitted waves 704a and 704b. To transform an incoming wave/beam 703 into multi-armed waves/beams 704a and 704b, the mmWall 700 adopts an additional degree-of-freedom, time, in the control lines 702a, 702b, and 702c.

More specifically, a time-modulation in the voltage signal is added to achieve a time-varying transmission-amplitude |T| and phase <T. When this time-varying transmission signal is periodic, its Fourier transformation becomes harmonic and creates multiple beams 704a and 704b with different frequencies, also known as sidebands. Hence, by applying a proper time-varying voltage signal of voltages ($U_E$, $U_M$) 702a-c to meta-atom pairs 701a, 701b, and 701c, the mmWall 700 can generate the time-varying signal response, in which its Fourier transformation creates a desired number of beams 703a, 703b at desired frequencies.

The time-varying voltage signal of voltages $U_E$ and $U_M$ are $Ú_E$ and $Ú_M$ for the electric 503 and magnetic 504 meta-atom and can be defined as $U_{amp}f(t)+U_{offset}$ where $U_{amp}$ is the voltage amplitude, $U_{offset}$ is the voltage offset and $F(t)=\Sigma_n^n(a^n \cos[n(\Omega t-\psi)]+b^n \sin n(\psi t-\Omega)])$ is a normalized Fourier series with a modulation frequency $\Omega$, time t, and phase $\psi$. The goal is to find the solution $\Theta^*$ to the following optimization problem:

$$\Theta^* = \frac{\arg\max}{\Theta} OBJ(F(T(\Theta))) \quad \text{Equation 4}$$

Where $\Theta^*$ is an optimal set of the voltage waveform coefficients ($U_{amp}$, $U_{offset}$, {a}, {b}, $\psi$). T($\Theta$) is a mapping function from the voltage waveform to the Huygens' pattern in FIG. 6B and $\mathcal{F}$ (T($\Theta$)) is a Fourier transformation of the time-varying transmission signal. OBJ ($\mathcal{F}$ (T($\Theta$)) is the objective function characterizing the scattered power of the desired beams 704a and 704b at a desired frequency bin.

To illustrate, as shown in FIG. 6A, when a constant DC voltage is applied by control lines 602a, 602b, and 602c to meta-atom pairs 601a, 601b, and 601c it results in a constant transmission-amplitude |T| and phase <T that creates a single beam at a carrier frequency based on the Huygens' pattern shown in FIG. 6B. However, to create the multi-armed beam scenario shown in FIG. 7, the goal is to split the incident beam 703 into two, one beam 704a at $f_c+\Omega$ and a second beam $704b$ at $f_c-\Omega$, where $f_c+\Omega$. is the voltage modulation frequency. Additionally, for this example it is desired that more energy is concentrated towards the second beam $704b$ at $f_c-\Omega$ than the first beam $704a$ at $f_c+\Omega$. Equation 4, can be redefined to search for a proper $\Theta$ that produces the desired results, such that $\mathcal{F}(T(\Theta))$ has a large peak at $f_c-\Omega$ and a relatively smaller peak at $f_c+\Omega$. Accordingly, the objective function goal is to maximize the sum of the weighted power at $f_c-\Omega$ and $f_c+\Omega$. After optimizing with the geneticsalgorithm, the mmWall 700 concurrently steers the produced multi-armed beams 704a, 704b by applying different phase shifts to the optimized voltage waveform of each meta-atom pair 701a-c.

Embodiments, e.g., mmWall 600 and mmWall 700, are also able to reflect the incident wave/signal, e.g., 703, 603, back as a mirror. To convert the transmission mode to the reflective mode, a 180 degree phase shift is added to $\dot{U}_E$ or $\dot{U}_M$. When the phases of $\dot{U}_E$ and $\dot{U}_M$ are identical, embodiments act as a "lens" whereas with 180 degree phase difference between $\dot{U}_E$ and $\dot{U}_M$, embodiments act as a "mirror."

To evaluate the ability of an embodiment of the mmWall's ability to steer mmWave beams, a high-frequency structure simulator (HFSS) simulation was run of a mmWall design with 20 meta-atoms. Each electrical component was modeled based on its Simulation Program with Integrated Circuit Emphasis (SPICE) model, e.g., the circuit diagrams 400a and 400b of FIG. 5A. Three scenarios were evaluated: single transmissive beam, two transmissive beams, and two reflective beams. For the single beam, the incident wave at $f_c$ was transformed to an emitted wave at $f_c-\Omega$. For the multi-armed beam scenarios, the incident wave at $f_c$ was transformed into two emitted beams 704a, 704b, one at $f_c+\Omega$ and another at $f_c-\Omega$.

Figures 8A, 8B, 8C:
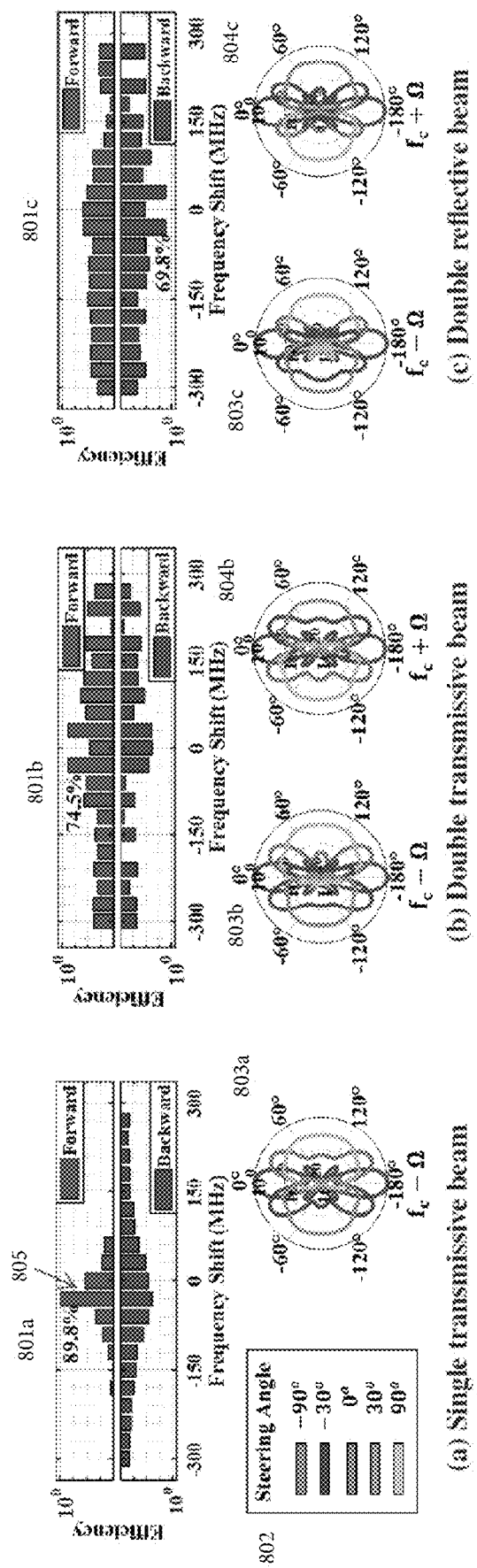
FIG. 8A illustrates results of a high-frequency structure simulator (HFSS) simulation of an embodiment of the invention for a single transmissive beam.
FIG. 8B illustrates results of a HFSS simulation of an embodiment of the invention for a double transmissive beam.
FIG. 8C illustrates results of a HFSS simulation of an embodiment of the invention for a double reflective beam.

FIG. 8A shows the results of said HFSS simulation run of a mmWall embodiment of the invention for a single transmissive beam, e.g., 600 of FIG. 6A. The graph 801a shows transmitted beam efficiency versus frequency shift in log scale. Key 802 provides the steering angle for plot 803a. Plot 803a shows beam-steering accuracy for a range of steering angles. For a single transmissive beam, a single peak 805 is observed at the −30 MHz frequency shift of the forward spectrum. Here, the frequency shift of 0 MHz indicates carrier frequency at 24 GHz, and −30 MHz frequency shift denotes 24 GHz. As a −30 MHz frequency shift is equivalent to $f_c-\Omega$. The peak 804 has 89.8% efficiency, indicating that nearly 90% of the incident signal is relayed with only −0.46 dB loss.

Figure 7:
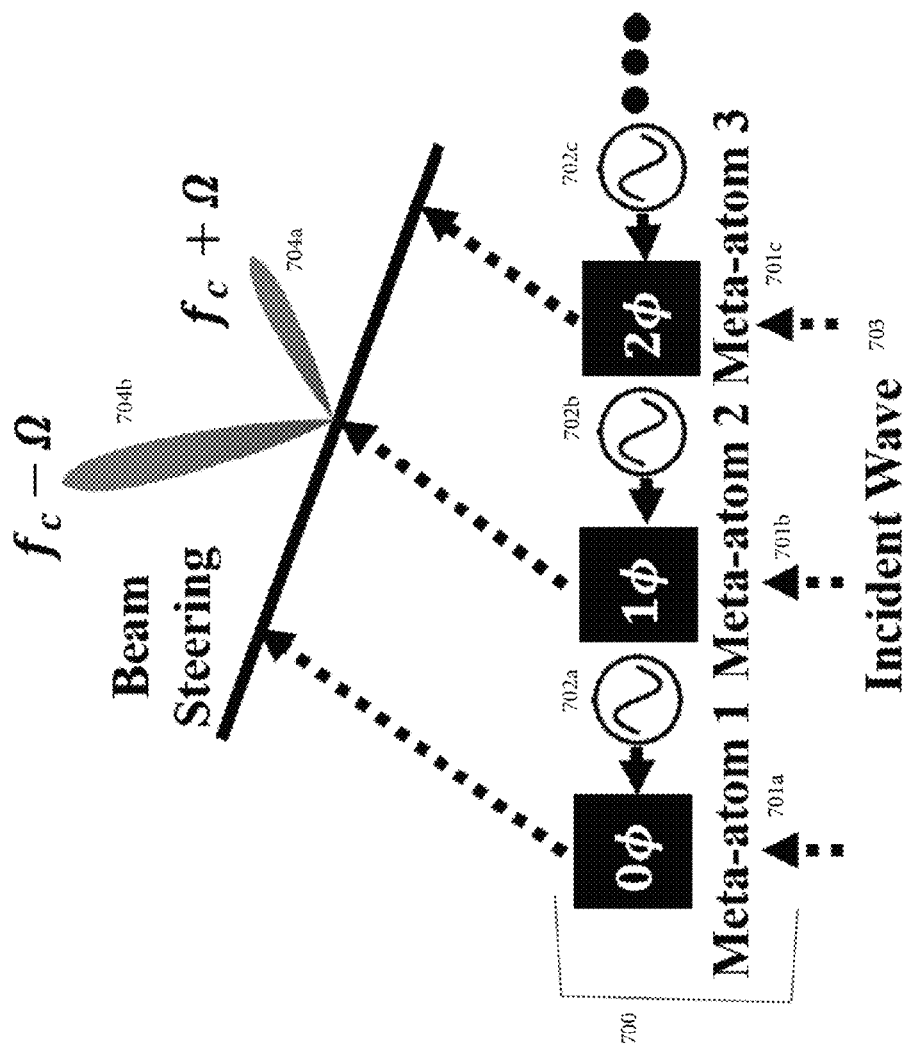
FIG. 7 is a schematic illustration of beam splitting using an embodiment of the invention.

FIG. 8B shows the results of a HFSS simulation performed for a mmWall embodiment of the invention for a double transmissive beam, e.g., wall 700 of FIG. 7. The graph 801b shows transmitted beam efficiency versus frequency shift in log scale. Key 802 provides the steering angle for plots 803b and 804b. Plot 803b shows beam-steering accuracy for a range of steering angles for the beam emitted at $f_c-\Omega$. Plot 804b shows beam-steering accuracy for a range of steering angles for the beam emitted at $f_c+\Omega$.

FIG. 8C shows the results of a HFSS simulation performed for a mmWall embodiment of the invention for a double reflective beam. The graph 801c shows transmitted beam efficiency versus frequency shift in log scale. Key 802 provides the steering angle for plots 803c and 804c. Plot 803c shows beam-steering accuracy for a range of steering angles for the beam emitted at $f_c-\Omega$. Plot 804c shows beam-steering accuracy for a range of steering angles for the beam emitted at $f_c+\Omega$.

For the double transmissive beams and double reflective beams, the sum of beam efficiency at $f_c+\Omega$ and $f_c-\Omega$ is 74.5% (approximately 1.24 dB loss) and 69.8% (approximately 1.56 dB loss), accordingly. It is shown that for the double-beam scenarios, mmWall embodiments correctly steer the beam at $f_c+\Omega$ and $f_c-\Omega$ simultaneously.

Furthermore, as the emitted beams are steered away from 0 degree, where 0 degree means no phase shift applied across the meta-atoms, the peak power of the beam slightly weakens. For all three simulated scenarios there is a about −2 dB loss as the beam is steered by −30 or 30 degrees. At −90 or 90 degrees of beam-steering angle, there is approximately −3 dB signal loss.

Figure 8D:
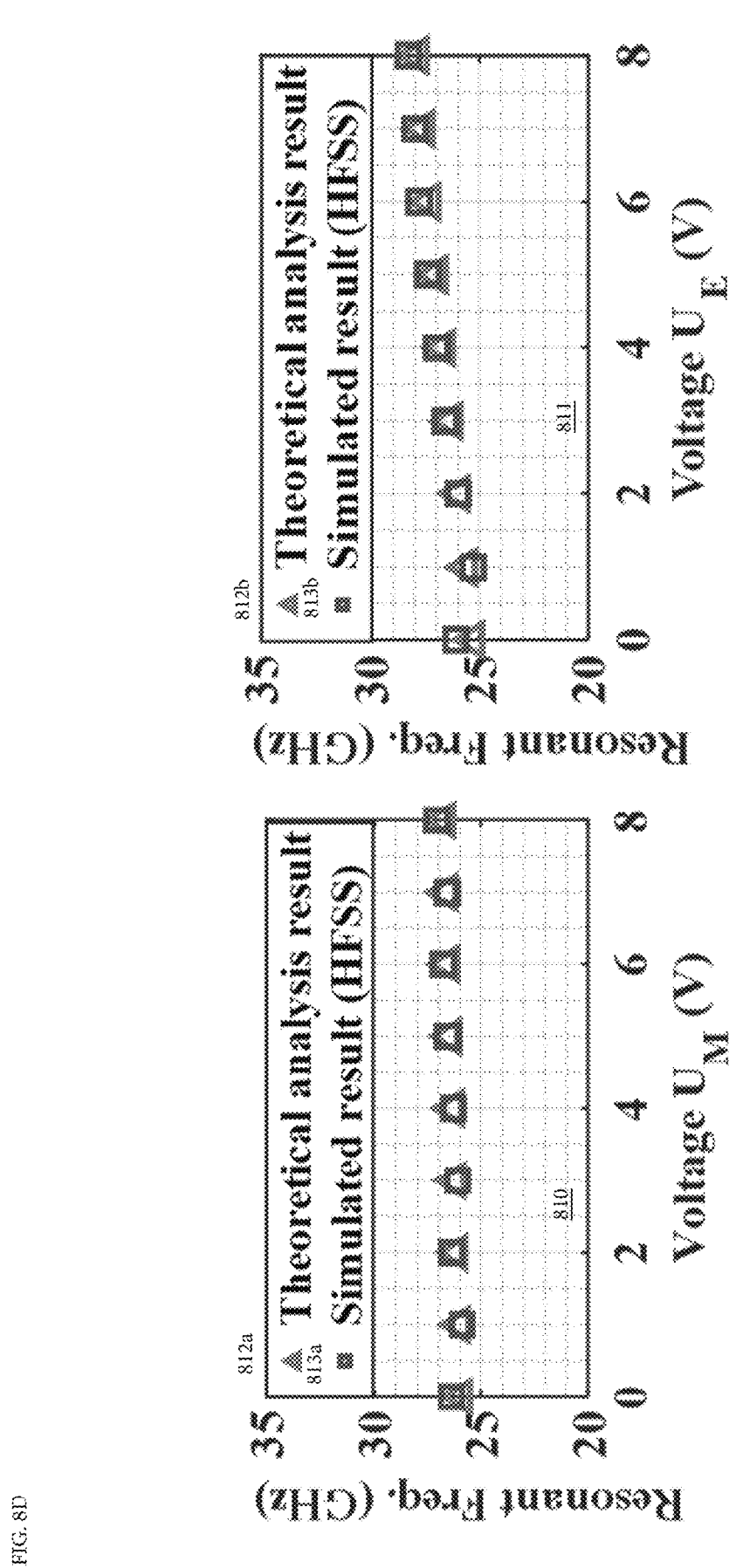
FIG. 8D shows the results of a HFSS simulation derived resonant frequency compared the theoretically calculated resonantly frequency for the novel meta-atom designs used by embodiments of the invention.

FIG. 8D shows the results of a HFSS simulation derived resonant frequency compared to the theoretically calculated resonantly frequency for the novel meta-atom designs used by embodiments of the invention. Graph 810 shows the comparison of the theoretical result 812a and the simulated result 813a for the resonant frequency of the magnetic meta-atom 504 for a range of applied voltages, $U_M$. Graph 811 shows the comparison of the theoretical result 812b and the simulated result 813b for the resonant frequency of the electric meta-atom 503 for a range of applied voltages, $U_E$. Graphs 810 and 811 both show that the theoretical calculations are very accurate when compared to the simulated results.

Figures 9A, 9B:
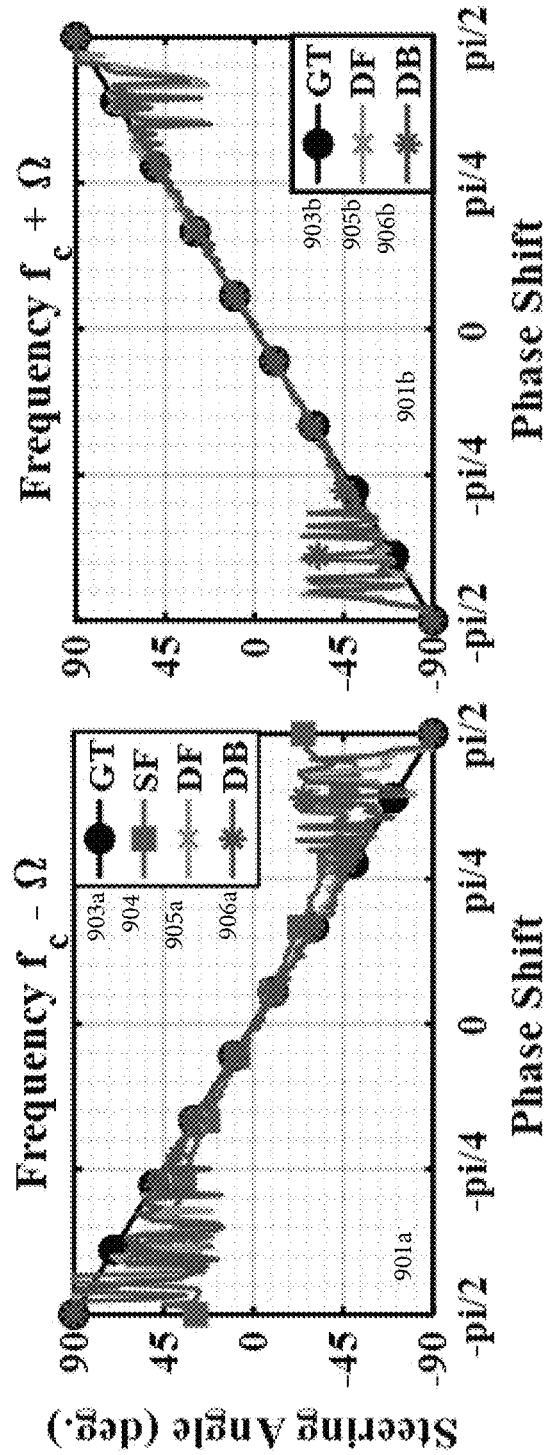
FIGS. 9A and 9B are graphs of the beam steering performance of the three simulated scenarios of FIGS. 8A, 8B, and 8C versus the relative phase shift ($\phi$) across different meta-atoms.

FIGS. 9A and 9B are graphs 901a, 901b of the beam steering performance of the three simulated scenarios of FIGS. 8A, 8B, and 8C as the relative phase value $\phi$ across different meta-atoms. The graphs 901a and 902b measure the angle of the peak efficiency of the transmitted or reflected beam. Graph 901a shows the steering performance of the beam at $f_c-\Omega$ and graph 901b shows the steering performance of the beam at $f_c+\Omega$. The ground-truth ("GT") values 903a-b are colored in black with the circle markers. For every scenario, single-transmissive beam (SF) 904, double-transmissive beam (DF) 905a-b, and double reflective beam (DB) 906a-b, the beam steering angle is highly accurate except for the angle below −π/4 phase shift and above +π/4 phase shift. This can be seen in the graphs 901a and 901b where the beam steering angles 904, 905a-b, and 906a-b differ from the GT 903a-b. This variation is because, as it steers to a larger angle, the beam may not look symmetric, and thus the peak may not be in the center of the beam.

Figure 10B:
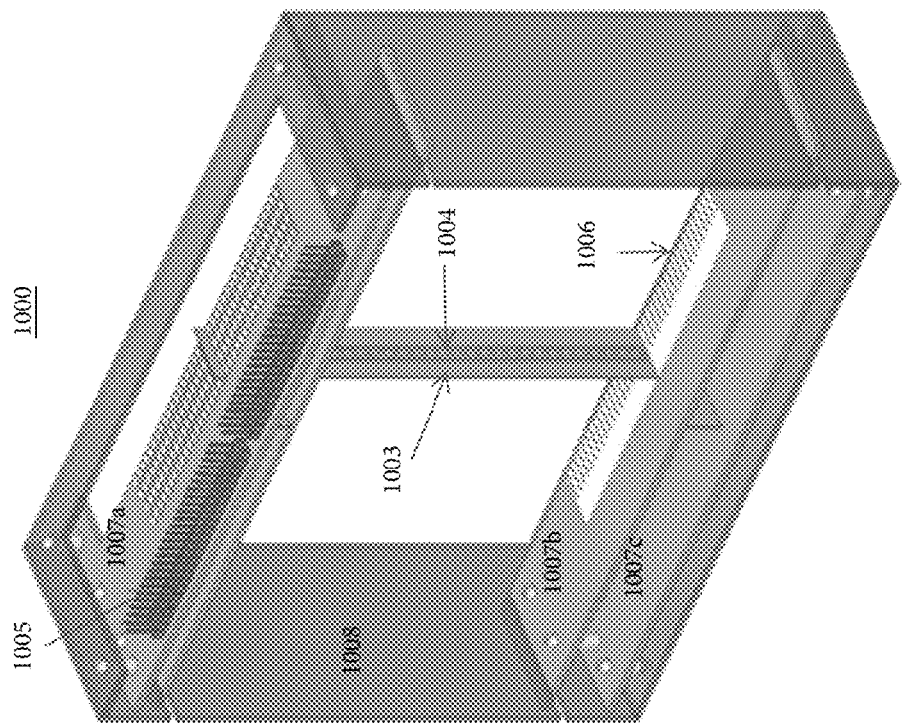
FIG. 10B is a back cutaway illustration of the magnetic side of an embodiment with one board installed.
Figure 10A:
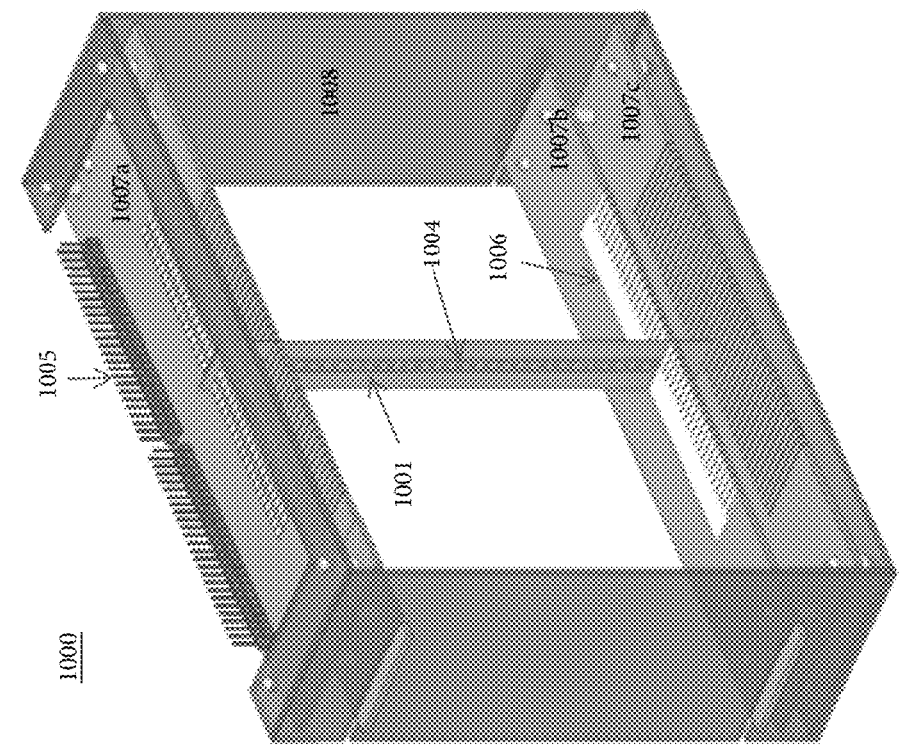
FIG. 10A is a front cutaway illustration of the magnetic side of an embodiment with one board installed.
Figure 11B:
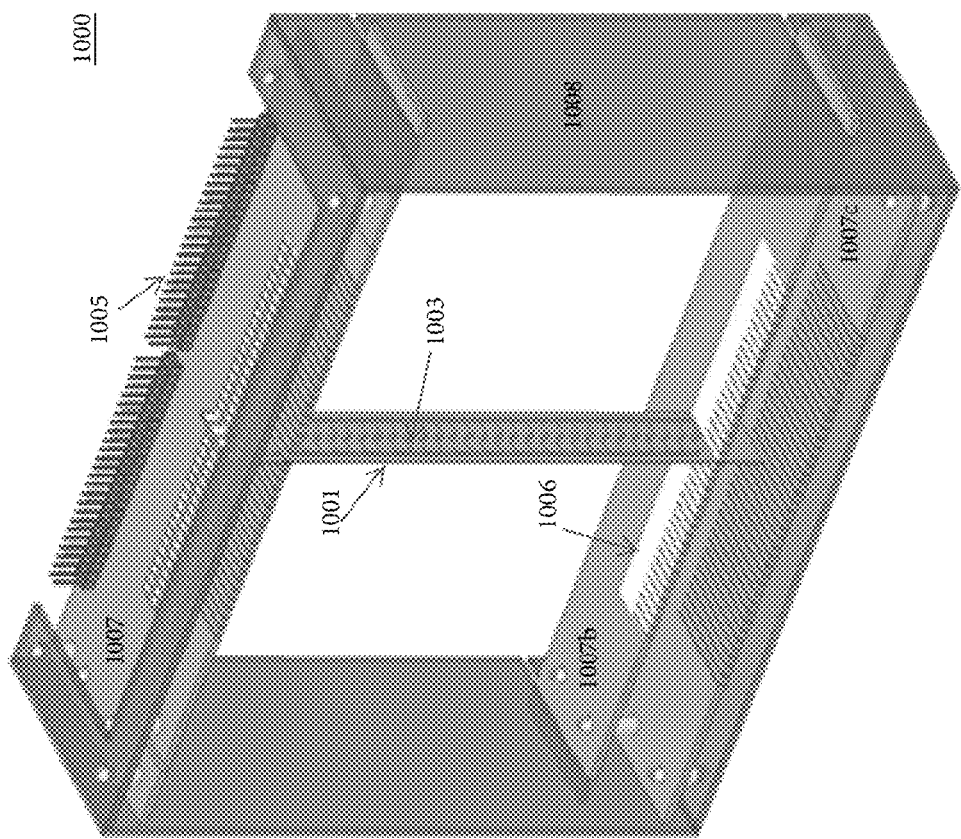
FIG. 11B is a back cutaway illustration of the electrical side of an embodiment with one board installed.
Figure 11A:
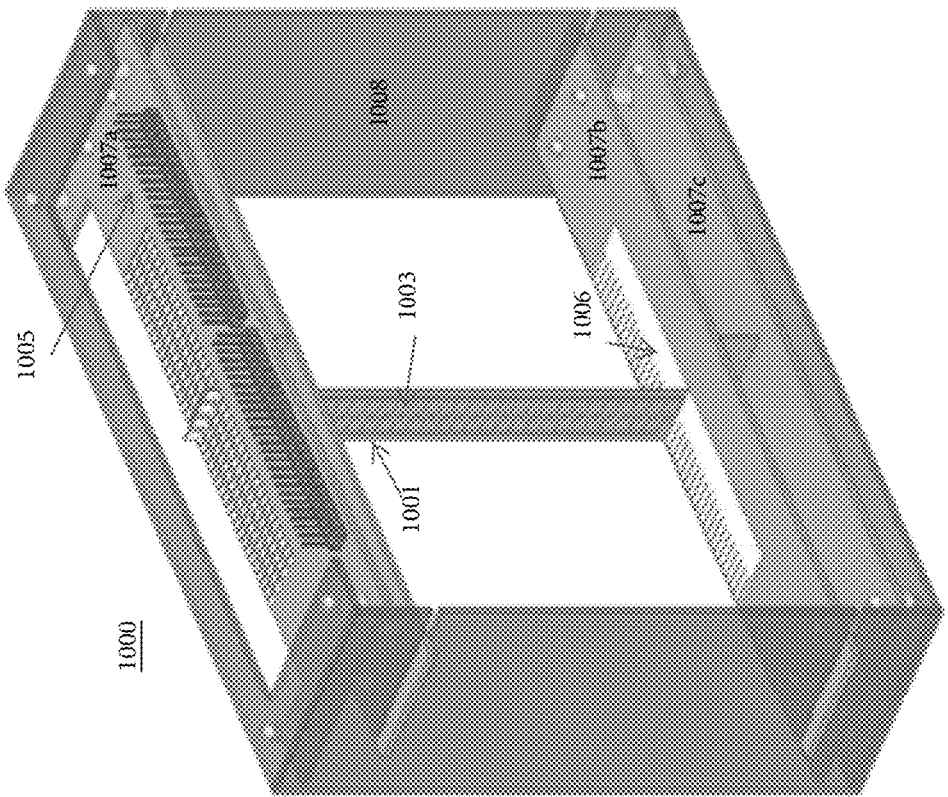
FIG. 11A is a front cutaway illustration of the electrical side of an embodiment with one board installed.

FIG. 10A is a front cutaway illustration of the magnetic side of a mmWall 1000, according to an embodiment of the invention. FIG. 10B is a back cutaway illustration of the magnetic side of a mmWall 1000, according to an embodiment of the invention FIG. 11A is a front cutaway illustration of the electric side of a mmWall 1000, according to an embodiment of the invention. FIG. 11B is a back cutaway illustration of the magnetic side of a mmWall 1000, according to an embodiment of the invention In FIGS. 10A-B and 11A-B, the interior of mmWall 1000 has a series of parallel boards 1001. FIGS. 10A, 10B, 11A, and 11B show one board 1001 installed. The boards 1001 include meta-atom pairs of magnetic meta-atom 1004 and electric meta-atom 1003 separated by the board 1001. FIGS. 10A and 10B show the side of board 1001 with magnetic meta-atoms 1004. FIGS. 11A and 11B show the side of board 1001 with electric meta-atoms 1003. The boards 1001 may include a series of meta-atom pairs. The boards 1001 include control lines to supply voltage to the meta-atom pairs, where the voltage is used to control how the meta-atom pairs transform an incident wave.

The boards 1001 are connected to perfect electrical conduct (PEC) supports 1007a, 1007b, and 1007b (collectively 1007). The PEC supports 1007 may be parallel to each other and perpendicular to boards 1001. The PEC supports 1007 may include slots 1006 to add extra structural support for boards 1001 and allow them to be inserted into PEC supports 1007. The PEC supports 1007 may be made of FR4 substrate with copper metal on their top or bottom surfaces. The PEC supports 1007 mimic the infinite periodical condition of the meta-atoms on boards 1001. The PEC supports 1007 are connected to a digital to analog converter (DAC), for example by pin header connector 1005. The PEC supports 1007 include control lines to supply voltage received from connector 1005 to each of the boards 1001 and can be soldered with each board 1001. The mmWall 1000 includes enclosure 1008 to cover and protect interior components such as the boards 1001 and meta-atom pairs. The PEC supports 1004 may be connected to enclosure 1008 to stabilize the mmWall 1000 and the boards 1001 and their meta-atom pairs still.

FIG. 12A is a front cutaway illustration of the magnetic side of a mmWall 1000 with all boards 1001 installed, according to an embodiment of the invention. FIG. 12B is a back cutaway illustration of the magnetic side of a mmWall 1000 with all boards 1001 installed, according to an embodiment of the invention. FIG. 12C is a front cutaway illustration of the electrical side of a mmWall 1000 with all boards 1001 installed, according to an embodiment of the invention. FIG. 12D is a back cutaway illustration of the electrical side of a mmWall 1000 with all boards 1001 installed, according to an embodiment of the invention.

FIG. 13A is an illustration of the electric side of a mmWall board 1001, according to an embodiment of the invention. FIG. 13B is an illustration of the magnetic side of a mmWall board 1001, according to an embodiment of the invention. The electric side of the mmWall board 1001 includes electric meta-atoms 1003. The magnetic side of the mmWall board 1001 includes magnetic meta-atoms 1004. The electric 1003 and magnetic 1004 meta-atoms form meta-atom pairs, separated by the dielectric substrate of the mmWall board 1001. These meta-atom pairs, due to the novel circular designs 503 and 504 have resonant frequencies in the mmWave spectrum and can transform an incident mmWave, e.g., 603,703, into one or more emitted mmWaves, e.g., 604, 704a, 704b. The properties of the emitted wave(s) 604, 704a, 704b can be controlled by voltage ($U_E$, $U_M$) supplied to the meta-atoms 1003 and 1004. Structural support elements 1107 are used to connect mmWall boards 1001 to the PEC supports 1007, for example by interfacing with slots 1006, as shown in FIGS. 10A-B and 11A-B.

Voltage is received from the supports 1004 at soldered connections, e.g. copper patches, 1104. One soldered connection 1104 provides voltage for the electrical side, another soldered connection 1104 provides voltage for the magnetic side. The remaining soldered connections 1104 are ground. Copper control lines 1105 carry the received voltage to all meta-atoms 1003 and 1004. Control lines 1105 are designed to simultaneously control, by supplying voltage, all meta-atoms 1003 and 1004 in one board. This simplifies the controlling procedure of the massive number of fine-scale meta-atoms.

Vias 1106 can be used to connect control lines 1105 on the magnetic side to soldered connections 1104. Vias 1106 are designed to have the proper via size so that their copper does not affect the control lines 1105 microstrip. The vias 1106 may have a drill size of 0.15 mm, an annular ring size of 0.15 mm, and a copper plated thickness of 0.035 mm.

If control lines 1105 are simple vertical straight copper lines (microstrip) they induce unwanted high-frequency AC signals. These induced signals interfere with the radio frequency (RF) effect from the meta-atoms 1003 and 1004. Therefore, embodiments add a RF choke to choke off the undesired signals generated by control lines 1105. Embodiments of the invention provide a novel solution to this problem. If the control line 1105 is made long enough, it behaves like a RF choke. Copper width and lengths of control lines 1105 can be precisely calculated and chosen to make it behave like a RF choke at the desired frequency (e.g. mmWave frequency 24 GHz). By meandering the control lines 1105, they can be made long and thin enough to act as both a RF choke and control lines.

For the magnetic side, due to proper spacing between the meandering control line 1105 and the magnetic meta-atom 1004 no additional component is needed. This is because the straight copper line connecting the two elements is short enough to not induce unwanted signals.

For the electrical side, the connecting line between the meandering control line 1105 and the electric meta-atom 1003 may be long enough to require the addition of two inductors, acting as RF chokes, near each meta-atom 1003 to choke off high-frequency AC signals generated by the connecting line. These added inductors take up space and increase the need for the novel circular meta-atom designs 503, 504 as they would not fit if the existing square designs 203, 204 are used.

Meandering control lines 1105 are designed and located on board 1001 to be separated because when they are facing each other they can act like a parallel plate capacitor, adding unwanted capacitance.

FIG. 14A is a close up view of an electric meta-atom 1003, 503 and surrounding area of the electrical side of a mmWall board 1001, according to an embodiment of the invention. FIG. 14B is a close up view of a magnetic meta-atom 1004, 504 and surrounding area of the magnetic side of a mmWall board 1001. In FIG. 14A meandering control lines 1105 are connected to the meta-atom 1003, 503 by copper strips 1110a-b. Likewise, in FIG. 14B meandering control lines 1105 are connected to the meta-atom 1004,504 by the copper strips 1100a-b. Meandering control lines 1105 supply voltage to the meta-atoms 1003, 503, 1004, 504 and alter their capacitance due to the presence of varactor diodes 1109a-b. This altered capacitance changes the properties of emitted wave(s), e.g., 604, 704a, and 704b, based on the Huygens' pattern (shown in FIG. 6B) of the meta-atom pair.

For the magnetic side, shown in FIG. 14B, connecting lines 1100a-b between meandering control lines 1105 and magnetic meta-atom 1004, 504 are too short to induce any interfering high-frequency AC signals. Furthermore, meandering control line 1105 acts as a RF choke for any AC signals it generates.

For the electric side, shown in FIG. 14A, connecting lines 1110a-b between meandering control lines 1105 and electric meta-atom 1003, 503 are long enough to induce interfering high-frequency AC signals. Therefore, two inductors 1108a-b, acting as RF chokes, are placed between connecting line 1110a-b and electric meta-atom 1003, 503 to prevent any interference. Meandering control line 1105 still acts as a RF choke for any AC signals it generates before connecting lines 1110a-b.

FIG. 15A is an illustration of the electric side of a mmWall board 1001, according to an embodiment of the invention. FIG. 15B is an illustration of the magnetic side of a mmWall board 1001, according to an embodiment of the invention. The design shown in FIGS. 15A and 15B shares the same components, with the same function, as the design shown in FIGS. 13A and 13B. However, in the design of FIGS. 15A and 15B, the electric and magnetic side share a control line 1105. Therefore, there are only three soldered connections 1104 and two vias 1106 connecting the soldered connections and the control lines 1106. The meandering control lines 1105, meta-atoms 1003, 1004, supports 1107 all function are as described in reference to FIGS. 13A and 13B.

Figure 16B:
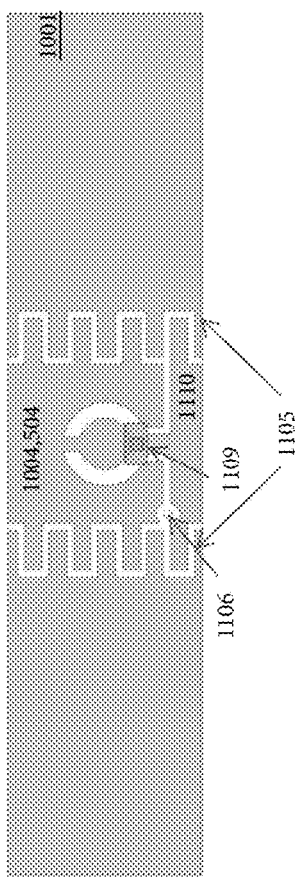
FIG. 16B is a close up view of a magnetic meta-atom and surrounding area of the magnetic side of a board according to an embodiment of the invention.
Figure 16A:
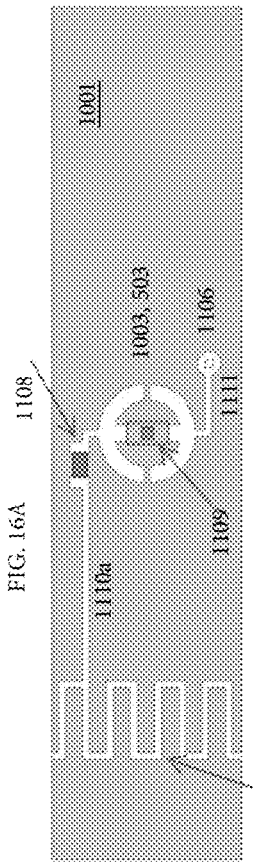
FIG. 16A is a close up view of an example electric meta-atom and surrounding area of the electrical side of a board according to an embodiment of the invention.

FIG. 16A is a close up view of an electric meta-atom 1003, 503 and surrounding area of the electrical side of a mmWall board 1001, according to the embodiment of the invention depicted in FIG. 15A. FIG. 16B is a close up view of a magnetic meta-atom 1004, 504 and surrounding area of the magnetic side of a mmWall board 1001, according to the embodiment of the invention depicted in FIG. 16A. FIGS. 16A and 16B share the same components, with the same function, as the design shown in FIGS. 14A and 14B. However, instead of having a connecting lines 1110a-b between the electric meta-atom 1003, 503 and electric ground control line 1105, it has a connecting line 1111 between electric meta-atom 1003, 503 and a via 1106 to shared control line 1105. Because connecting line 1111 is shorter than connecting line 1110b, it does not induce AC signals and does not need an intervening inductor 1108 and can be directly connected to electric meta-atom 1003, 503. The vias 1106, are designed to be the proper size so they do not affect either the meandering control lines 1105 or the connecting lines 1100a, 1111.

Figure 17A:
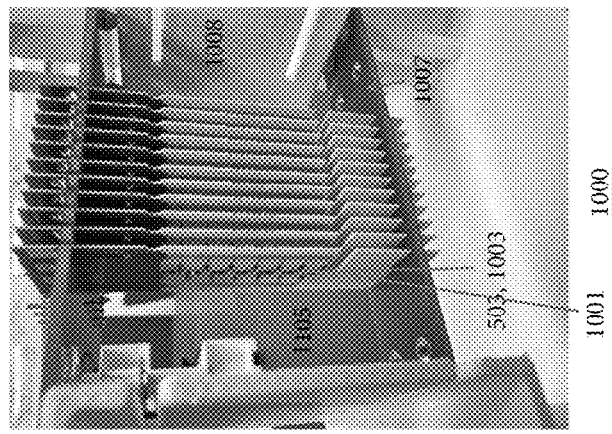
FIGS. 17A, 17B, and 17C are photographs of a section of a metamaterial surface, according to an embodiment of the invention.
Figure 17B:
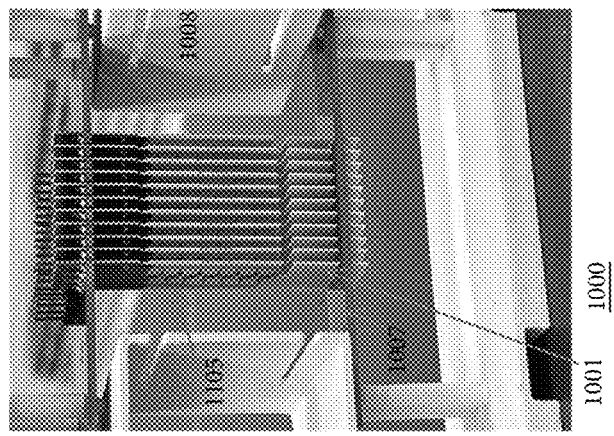
Figure 17C:
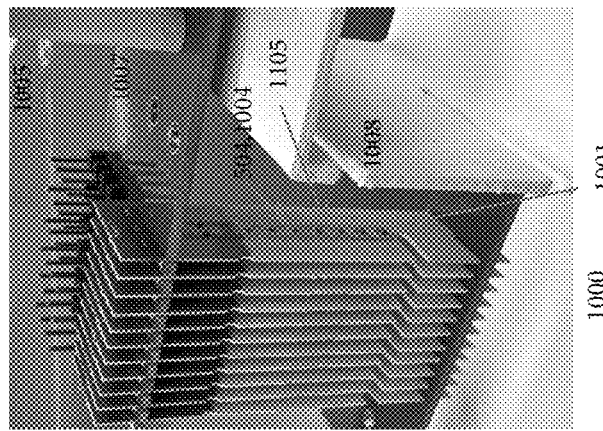

FIGS. 17A, 17B, and 17C are photographs of a mmWall 1000 section, according to an embodiment of the invention. mmWall section 1000 includes mmWall boards 1001, that have meta-atom pairs each comprised of an electric 503, 1003 and magnetic 504, 1004 meta-atom. The meta-atoms are controlled, with voltage supplied by meandering control lines 1105. Supports 1007 hold mmWall boards 1001 to the enclosing structure 1008 and supply voltage, received from connector 1005, to meandering control lines.

FIG. 18A is a photograph of the magnetic side of a mmWall 1000 section with a shared ground control line 1105. FIG. 18B is a photograph of the electric side of a prototype mmWall 1000 section with a shared ground control line 1105. FIGS. 18A and 18B and their labeled elements correspond to the illustrated designs of FIGS. 16A and 16B. Due to the shared ground control line 1105, the distance of the connecting line between electric meta-atom 503, 1003 and the shared ground control line 1105 is short enough to not induce AC signals. Therefore, only one inductor 1108 is used, separating the longer voltage supplying control line 1105 and the electric meta-atom 503, 1003 in FIG. 18B.

FIG. 18C is a photograph of the magnetic side of a mmWall 1000 section with separate ground control lines 1105. FIG. 18D is a photograph of the electric side of a mmWall 1000 section with separate ground control lines 1105. FIGS. 18C and 18D and their labeled elements correspond to the illustrated designs of FIGS. 14A and 14B. Because the mmWave boards 1001 of the design shown in FIGS. 18C and 18D do not share ground control lines 1105, the connecting lines between the electrical control line 1105 and the electrical meta-atom 503, 1003 are long enough to induce potentially interfering AC signals. Therefore, two inductors 1108 are used, separating the voltage and ground control lines 1105 and the electrical meta-atom 503, 1003.

Embodiments of the invention, including the described mmWall, enable fast mmWave beam relay from outdoor to indoor, indoor to outdoor, indoor to indoor, and outdoor to outdoor. Besides simply relaying or reflecting an incident beam, the embodiments timely redirect the beam power to an arbitrary direction when the end user moves. mmWave technology faces a big challenge due to its weak ability to diffract around obstacles with a size significantly larger than the mmWave's wavelength. Since mmWave transmissions have an extremely short wavelength, they experience huge losses when traversing walls and obstacles, resulting in significant SNR drops of 20 dB. Thus, mmWave transmissions require a line-of-sight (LoS) path between the transmitter and receiver, which significantly limits 5G applications. For example, 5G indoor coverage poses problems as the wall blocks mmWave signals from a network base station. Instead of using 5G indoors, currently, operators offload traffic from the 5G network onto 4G or WiFi when a user moves from outdoors to indoors. This current solution incurs a handover delay and results in a sudden drop of spectral efficiency, which is critical in real-time applications, such as augmented reality. Similarly, the use of mmWave signals is problematic for communication within indoors settings. When human mobility obstructs the mmWave access point's signal to the user, the signal will be temporarily lost, causing a communication glitch. While temporary outages may be common in wireless communications. Applications like VR/AR streaming are non-elastic and cannot tolerate any degradation in SNR. Deploying multiple mmWave access points in buildings may mitigate the indoor blockage problem to some extent, but it increases the implementation costs and complexity in coordinating multiple access points. Service providers have recently begun adopting mmWave frequencies for wireless backhaul. However, mmWave signals do not travel as far as signals at lower frequencies and mmWave signals are readily absorbed by foliage or other obstacles, which hamper the deployment of outdoor mmWave wireless backhaul. To compensate for such propagation loss, the distribution nodes for mmWave networks need to be more densely placed than conventional mesh networks. Embodiments of the invention, avoid the need to increase endpoints of the wireless links, but instead, enable a new radio environment that can electronically reconfigure itself to relay mmWave signals for outdoor and/or indoor applications.

Figure 19A:
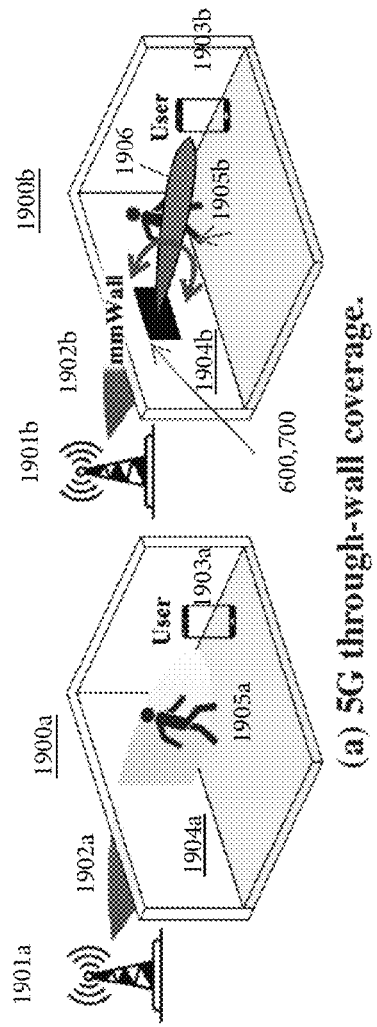
FIG. 19A is an illustration of an outdoor to indoor network with and without a mmWall.

FIG. 19A is an illustration of an outdoor to indoor network with 1900b and without 1900a a mmWall 600, 700. In network 1900a, outdoor base station 1901a transmits a wave 1902a, e.g. a mmWave, to user device 1903a. The transmitted wave 1902a is obstructed by wall 1904a and person 1905a. If network 1900a is a 5G network, the wavelength of wave 1902a will limit or even prevent any reception by user device 1903a.

In network 1900b, outdoor base station 1901b transmits a wave 1902b, e.g. a mmWave, to user device 1903b. However, network 1901b includes a mmWall 600, 700 on wall 1904b. Base station 1901b can transmit wave 1902b to mmWall 600, 700 that transforms wave 1902b into wave 1906 that is relayed to user device 1903b. mmWall 600, 700 enables transmission, with limited loss of beam power, through wall 1904b and also enables a diversity of paths from mmWall 600,700 to user device 1903b that can avoid person 1905b. mmWall 600, 700 can relay and re-focus wave 1902b by transforming it into wave 1906. mmWall 600,700 also provides path diversity to provide an alternative beam path when obstacles, such as human 1905b, block LoS.

Figure 19B:
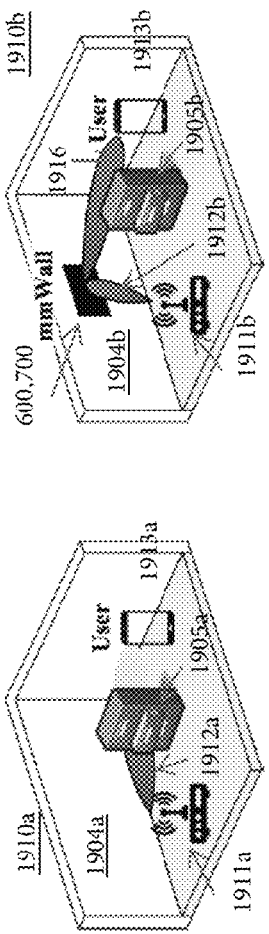
FIG. 19B is an illustration of an indoor to indoor network with and without a mmWall.

FIG. 19B is an illustration of an indoor to indoor network with 1910b and without 1910a a mmWall 600, 700. In network 1910a, indoor transmitter 1911a transmits a wave 1912a, e.g. a mmWave, to user device 1913a. Wave 1912a is obstructed by obstacle 1905a. If network 1910a l is a 5G network, the obstruction 1905a will prevent uses, such as AR/VR systems that require low latency.

In network 1910b, indoor transmitter 1911b transmits a wave 1912b, e.g. a mmWave, to mmWall 600, 700 on wall 1904b. mmWall 600, 700 then relays and transforms wave 1912b into wave 1916 directed to user device 1913b and around obstacle 1905b. mmWall 600, 700 provides a path diversity in an indoor network setting 1910b by reflecting transmitted wave 1902b around obstacle 1905b.

Figure 19C:
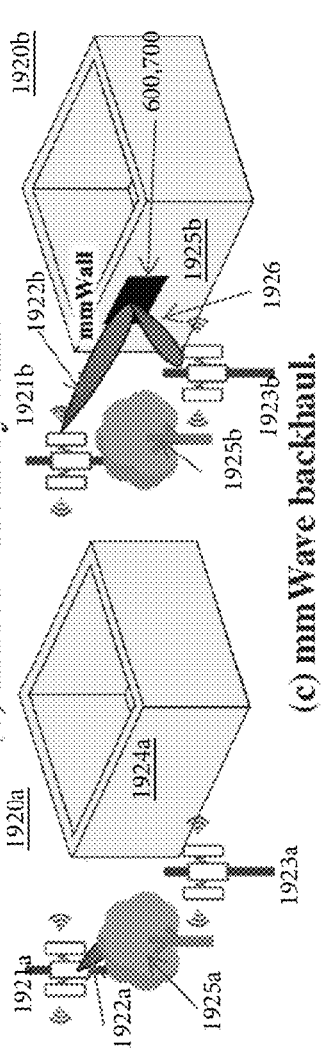
FIG. 19C is an illustration of an indoor to indoor network with and without a mmWall.

FIG. 19C is an illustration of an outdoor to outdoor network transmission with 1920b and without 1920a a mmWall 600, 700. In network 1920a, outdoor transmitter 1921a transmits a wave 1922a, e.g. a mmWave, to a receiver 1923a. The transmitter 1921a and receiver 1923a may be part of the backhaul portion of a 5G network. Obstacle 1925a, e.g. foliage, blocks the transmission of wave 1922a.

In network 1920b, outdoor transmitter 1921b transmits a wave 1922b, e.g., a mmWave, to receiver 1923b. The transmitter 1922b and receiver 1923b may be part of the backhaul portion of a 5G network. However, with the addition of mmWall 600,700 on wall 1925b, transmitter 1921b can indirectly transmit to receiver 1923b by using mmWall 600,700 to transform and relay wave 1922b into wave 1926 avoiding obstacle 1925b. mmWall 600,700 can perform, any combination of the features shown in FIGS. 19A-C to support both indoor, outdoor, and indoor/outdoor networks.

To compensate for any propagation loss, the mmWall 600, 700 can use highly directional antennas to focus the signal power in a narrow beam. Since mmWave networks use a "pencil-beam", they work only when the transmitter's beam is perfectly aligned with the receiver's beam. To correctly steer the beam towards the receiver, the metamaterials-based surface of embodiments can precisely control the phases of the incoming signal as detailed above. Moreover, since the size of mmWall's 600, 700 meta-atoms 503, 504 are much smaller than conventional antennas and extremely sensitive to coupling, the control lines 1105 are carefully designed to avoid undesirable coupling. Further still, existing systems use their own beam searching protocol to find the best alignment before exchanging data. To make mmWall 600, 700 compatible with different mmWave systems, an efficient beam alignment protocol is implemented by embodiments that leaves existing systems unchanged.

The mmWall 600, 700 is able to provide applications for cellular networks, Wi-Fi, and mmWave backhaul systems. An embodiment of the mmWall 600, 700 can operate in two modes: a lens mode and a mirror mode. In the lens mode, the mmWall 600, 700 relays an incident mmWave signal through the wall, allowing a user inside a building to better communicate with a base station (BS). This requires two beam alignments: one between the base station and mmWall 600, 700 and another between the mmWall and the user. In the mirror mode, the mmWall 600,700 reflects the incident mmWave signal. In indoor settings, it relays the beam between the access point and user within the building. Similarly, in outdoor settings, it reflects signals between the backhaul nodes. Both applications require a beam alignment between the transmitter node and mmWall 600, 700 and the receiver node.

One high-level system architecture according to an embodiment, is as follows: at an initial state, a beam search is performed between the base station and the mmWall 600, 700 and between the mmWall 600, 700 and the user simultaneously. Since both the base station and the mmWall 600, 700 are stationary, it is only necessary to align the beams between the mmWall 600, 700 and the user after the one-time initialization. Since the mmWall 600, 700 can act as both a downlink and uplink relay, downlink and uplink beam alignment will be further elaborated upon below. It is noted that for both uplink and downlink procedures described herein, no modifications of the existing cellular 5G systems are required. The mmWall 600, 700 is able to sweep any transmitted beam it generates or relays by storing, with using an innate or connected memory, and sequentially applying the voltages to its component meta-atoms 503, 504 required to apply a phase shift in one (1) degree increments.

FIG. 20A is an illustration of a network 2000a downlink initialization using a mmWall 600, 700. FIG. 20A summarizes a downlink beam alignment for cellular network 2000a. Base station 2001a is attempting to initialize a connection to user device ("user") 2005a using mmWall 600,700. When the base station 2001a signals to the user 2005a to initiate the beam search, the user 2005a starts controlling the mmWall 600, 700 using, for example, a low-bit rate radio, such as Bluetooth, taking over mmWall's 600, 700 task of measuring a best beam angle to the user 2005a. Specifically, when the base station 2001a starts sweeping the directional beam 2002a, the user 2005a signals the mmWall 600,700 to refract the beam 2002a from the base station at various angles 2003a. At the same time, the user 2005a also scans its receiver (Rx) beam 2004a in various directions. After the search, the user 2005a finds the combination of the base station's 2001a transmission beam 2002a angle, mmWall's beam 2003a refraction angle and the user's 2005a receiving beam 2004a angle that maximizes the SNR of downlink signals. The user 2004a may also store the voltage supplied to mmWall 600, 700 that achieves the refraction angle and beam path that maximizes SNR signal.

In conventional full-duplex based relay systems, the relay node's Rx beam is also aligned to the base station. However, unlike conventional relay systems, mmWall 600, 700 has no Rx beam. Hence, mmWall 600, 700 instead simply aligns its refracted beam 2003a to the user 2005a. In summary, the alignment between the base station 2001a and the mmWall 600, 700 takes O (n), and the alignment between mmWall 600, 700 and the user 2005a takes O ($n^2$). Therefore, one-time beam initialization from the base station 2001a to the user 2005a takes O ($n^3$). Since the base station 2001a and the mmWall 600, 700 are both stationary, they only need to be aligned once, when the mmWall 600, 700 is installed.

FIG. 20B is an illustration of a network 2000b uplink initialization using a mmWall 600, 700. FIG. 20B summarizes an uplink beam alignment for cellular network 2000b. User device ("user") 2005b is attempting to initialize a connection to base station 2001b using mmWall 600,700. User 2005b sweeps a transmission (Tx) beam 2003b and mmWall 600,700 refracts that beam 2003b as beam 2004b in various angles. Base station 2001a emits and sweeps beam 2002b. After the search, the user 2005b, finds the combination of the base station's 2001b transmission beam 2002b angle, mmWall's beam 2004b refraction angle and the user's 2005b Tx beam 2003b angle that maximizes the SNR of uplink signals. The user 2005b may also store the voltage supplied to mmWall 600, 700 that achieves the reflection angle and beam path that maximizes SNR signal.

Like downlink, uplink beam search requires the O ($n^3$) exhaustive beam search at an initial stage. As shown in FIG. 20B, the difference is now that the user 2005b sweeps the directional Tx beam 2003b towards the mmWall 600, 700, and the mmWall 600, 700 and the base station 2001b runs the O ($n^2$) exhaustive beam search. Again, the beam alignment between the mmWall 600, 700 and the base station

2001*b* is fixed. During the estimation and alignment process, the user 2005*b* still takes control of the mmWall 600, 700.

FIG. 20C is an illustration of a network 2000*c* with beam tracking between a mmWall 600, 700 and a user 2005*c*. Since the base station 2001*c* and the mmWall 600, 700 are stationary, only the mmWall's 600,700 Tx beam 2003*c* and the user device's ("user") 2005 Rx beam 2004*c* need to be aligned for downlink communication when the user 2005*c* moves. Hence, the beam search between the mmWall 600, 700 and the user 2005*c* employs an O ($n^2$) exhaustive beam search. In uplink communication, the incident beam angle varies with respect to the mmWall 600, 700 as the user 2005*c* moves. Changes in the incident beam angle results in an offset in the mmWall's 600,700 steering angle. Therefore, for uplink, an exhaustive search for the user's 2005*c* Tx beam 2004*c* and mmWall 600, 700 Tx beam 2003*c* is conducted while the Base station's 2001*c* Rx beam 2002*c* remains the same. Hence, both the uplink and downlink beam tracking take O ($n^2$) time complexity.

FIG. 20D is an illustration of a network 2000*d* with angular reciprocity using a mmWall 600, 700. As illustrated in FIG. 20D, mmWall 600, 700 has angular reciprocity. Therefore, when communication is bi-directional between base station 2001*d* and user device ("user") 2005*d*, the beams do not need to be separately aligned for downlink and uplink. For example, if downlink beam alignment has already been performed, as shown in FIG. 20A, resulting in beam 2002*d* from the base station 2001*d* being transformed into beam 2003*d* and relayed to user 2005*d*, the base station's 2001*d* transmission beam is simply changed from Tx to Rx and the user's 2005*d* Rx beam to Tx beam for uplink communication with the same configuration for mmWall 600, 700.

Unlike the system design for cellular networks, a system for Wi-Fi communication using embodiments of the invention such as mmWall 600, 700 can work in two ways. First, the AP communicates to the user directly. However, if the signal strength of the direct link between the AP and the user is weak, the system switches to a second way of operation where the AP redirects its beam to the mmWall (as shown in FIG. 19B). Then, like before, the mmWall delegates its task and control over it to the user and performs a one-time beam search between the AP and mmWall and between the mmWall and the user. The user may communicate with the mmWall before alignment using a low-bit rate radio, such as Bluetooth. Since the AP and the mmWall are fixed, after initialization, only the beam alignment between the mmWall and the user needs to be computed.

Since the user can be put in charge of controlling the mmWall, the user is able to alternate between the 'lens' mode for cellular communication and the 'mirror' mode for Wi-Fi communication. For example, when the user switches from 5G NR to Wi-Fi, it can send a signal to the mmWall to re-establish the beam estimation process for indoor usage.

For the mmWave backhaul application shown in FIG. 19C, the mmWall operates in two ways. First, when the LoS path between two backhaul nodes, 1921*b* and 1923*b*, is blocked due to at least one obstacle 1925*b*, the mmWall 600,700 is used to provide a strong reflective path. Second, the mmWall is able to also directly reflect the beam from the backhaul node to the end user.

Node-to-Node relay: Like the described architecture for 5G cellular networks and indoor Wi-Fi settings, a one-time beam search is performed between a transmitting node 1921*b*, the mmWall 600,700 and between the mmWall 600,700 and a receiving node 1923*b*. Since all backhaul nodes and the mmWall are stationary, the LoS path between them does not need to be aligned after the initial search. Whenever the LoS path between two backhaul nodes becomes weak, the transmitting node, mmWall, and receiving node configure to their pre-registered beam angle. The voltage that causes the mmWall to cause the pre-registered beam angle can be stored on an innate or connected memory of mmWall.

Node-to-User relay: For node-to-user relay, the beam alignment mechanism is similar to the one from 5G cellular networks, shown in FIGS. 20A and 20B. A one-time initialization between the transmitting node and the mmWall and between the mmWall and the end-user is performed. After the initial stage, only the beam search between the mmWall and the end-user needs to be conducted since the mmWall and transmitting node are stationary. After incorporating mmWall, the end-user can be located either indoor or outdoor since the mmWall is able to transmit signals through walls. Hence, while aligning the beam, mmWall sweeps the incident beam in a full 360-degree angle where half of it is indoor and the other half is outdoor.

Figure 21:
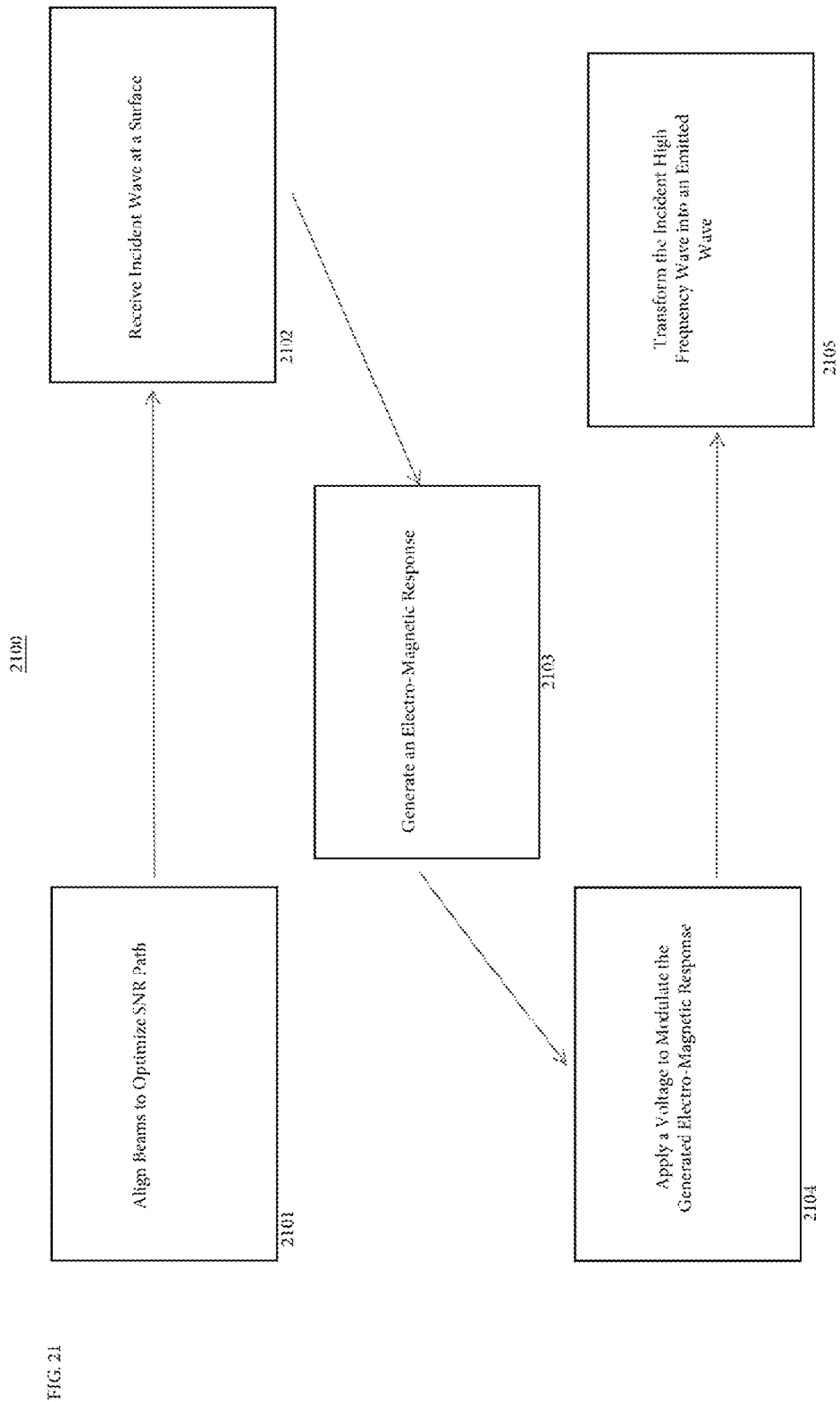
FIG. 21 is a flow chart of a method for transforming an incident high frequency wave, according to an embodiment of the invention.

FIG. 21 is a flow chart of a method 2100 for transforming an incident high frequency wave, according to an embodiment of the invention. The method 2100 includes steps 2101-2105 which together, transform an incident high frequency wave, e.g. a millimeter wave or a 5G signal, into an emitted wave using a meta surface, such as mmWall 600, 700. The method 2100 may be used to improve the 5G networks, indoor Wi-Fi networks, and backhaul networks as described herein. The method 2100 is able to receive at a surface, such as mmWall 600, 700, an incident high frequency wave and transform that wave into a wave emitted from the surface and control the properties, such as direction, phase, and amplitude, of the emitted wave. The surface, such as mmWall 600, 700, may act as a lens, where the emitted wave is on the other side of the surface from the incident wave or a mirror, where the emitted wave is on the same side of the surface as the incident wave.

The method 2100 optionally begins with step 2101, where the surface, transmitter of the incident wave, e.g. a network base station, and the receiver of the emitted wave, e.g. a user device, perform a beam alignment to determine the best path for incident and emitted waves. The best path may be determined by optimizing the signal-to-noise ratio (SNR) and avoid objects that cause interference.

Next, step 2102 is performed, the incident wave is received at the surface. In some embodiments, the method may start with step 2102, skipping step 2101. The surface is defined by magnetic meta-atoms 504 and electric meta-atoms 503 that form a plurality of meta-atom pairs. The properties and abilities of magnetic meta-atoms 504 and electric meta-atoms 503 and the surfaces they define have been described in detail herein.

In step, 2103, when the incident wave hits the magnetic meta-atoms 504 and electric meta-atoms 503 that define the surface, it generates an electro-magnetic response as the magnetic meta-atoms 504 and electric meta-atoms 503, acting as LC circuits, interact with the propagating fields of the incident wave.

In step, 2103, a voltage is applied to the magnetic meta-atoms 504 and electric meta-atoms 503 that define the surface. This applied voltage changes the LC circuits of magnetic meta-atoms 504 and electric meta-atoms 503. This may be because the magnetic meta-atoms 504 and electric meta-atoms 503 include a varactor capacitor 506*a*, 506*b*, or other circuit component that has variable capacitance or inductance across a range of voltages. By applying different voltages to the magnetic meta-atoms 504 and electric meta-atoms 503, the properties of the electro-magnetic response can be altered and/or modulated. The voltage applied may be in the form of a pattern over time or a steady voltage. The voltage applied may differ between magnetic meta-atoms 504 and electric meta-atoms 503 that define the surface to induce different electro-magnetic responses at different locations of the surface. How and when to apply the voltage can be controlled by a user device, or one or more other processer of a computer executing computer code instructions, that is in communication with the surface.

In step 2105, the incident wave is transformed into an emitted wave based on the modulated electro-magnetic response. By controlling and modulating the electro-magnetic response of the magnetic meta-atoms 504 and electric meta-atoms 503 by applying voltage step 2104, the properties of the emitted wave, in step 2105, can be controlled. The Emitted wave 2105 can contain the same information and/or data contained in the incident wave and be directed around or through obstacles that would have otherwise interfered with the incident wave.

Figure 22:
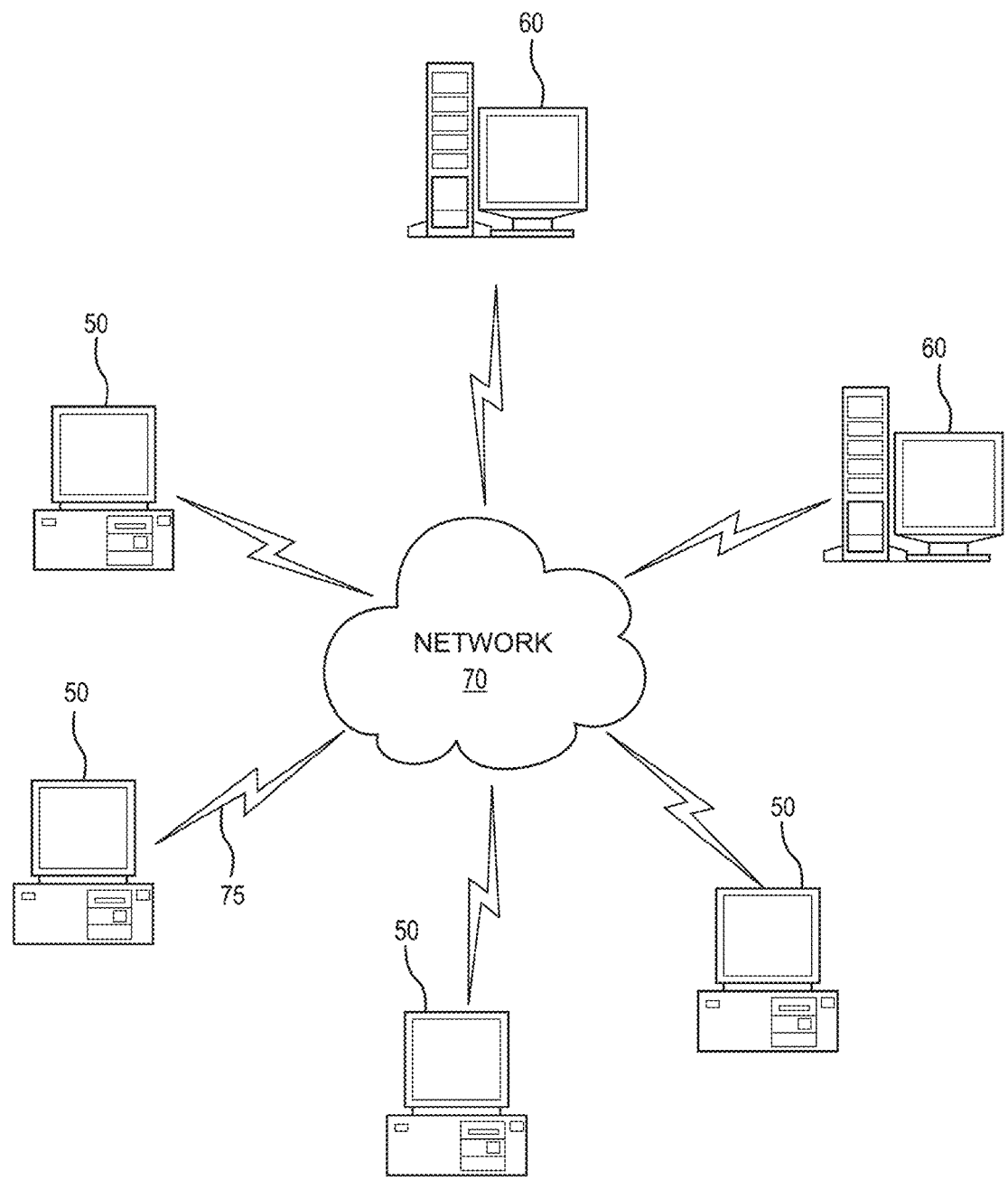
FIG. 22 is a schematic view of a computer network environment in which embodiments can be implemented.

FIG. 22 illustrates a computer network or similar digital processing environment in which the present embodiments may be implemented. Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), cloud computing servers or service, a worldwide collection of computers, Local area or Wide area networks, and gateways that currently use respective protocols (TCP/IP, Bluetooth, etc.) to communicate with one another. Other electronic device/computer network architectures are suitable. User devices, e.g. 108a-e, 1903b, 1913b, and 2005a-c that send or receive waves to and/or from mmWalls 600, 700 may be client computer(s)/devices 50 and server computer(s) 60. mmWall 600, 700, and other embodiments of the invention, may include processors or computers that function as client computer(s)/devices 50 and server computer(s) 60. Client computer(s)/devices 50 and server computer(s) 60, include user devices 108a-e, 1903b, 1913b, and 2005a-c and/or mmWall processors or computers may be configured to control the voltage supplied to meta-atoms 503, 504 and determine how the supplied voltage effects the transformation of waves incident on surfaces defined by meta-atoms 503, 504.

Figure 23:
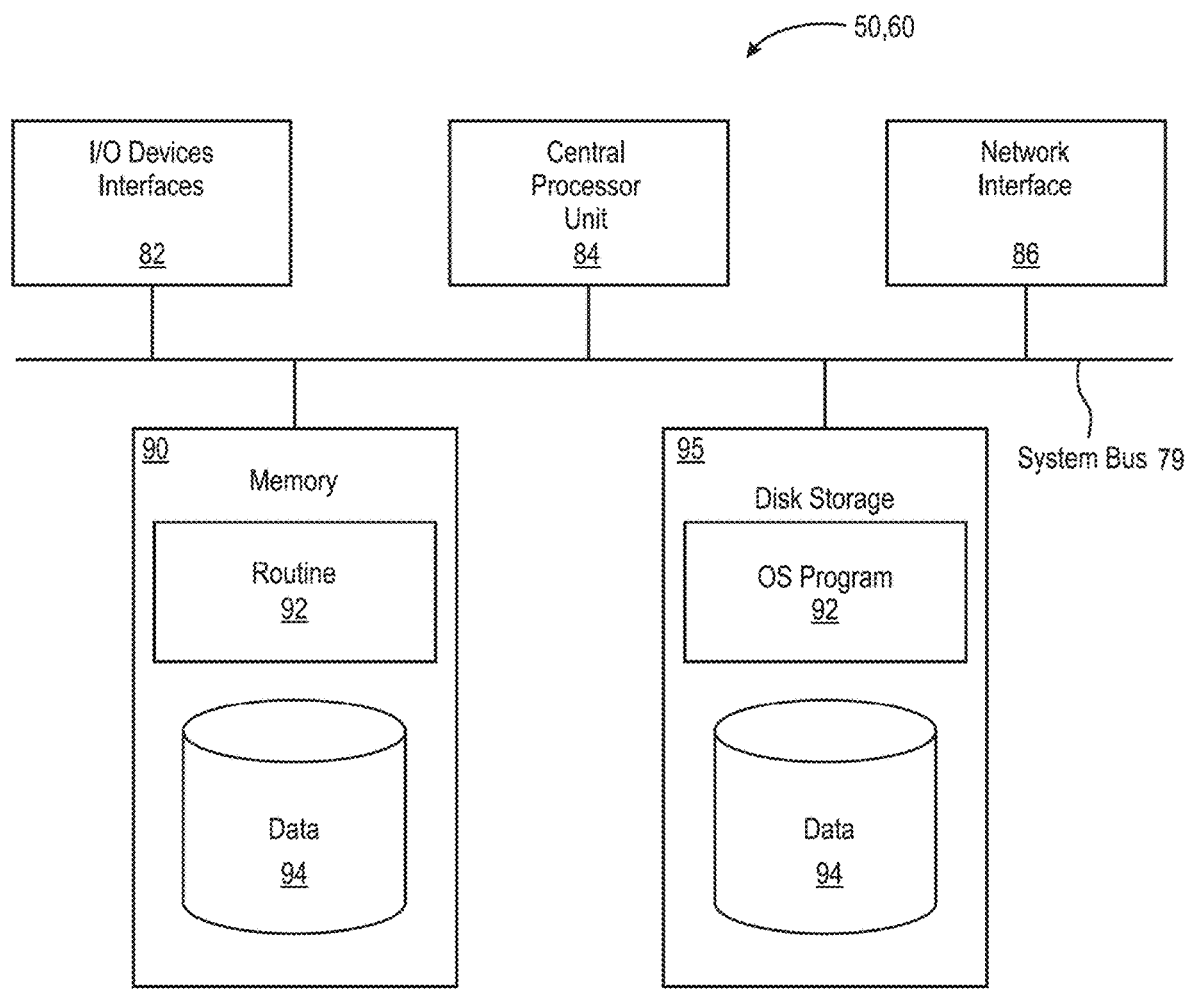
FIG. 23 is a block diagram of a computer node of the network of FIG. 22.

FIG. 23 is a diagram of the internal structure of a computer (e.g., client processor/device 50 or server computers 60) in the computer network of FIG. 22. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, and network ports) that enables the transfer of information between the elements. Attached to system bus 79 is I/O device interface 82 for connecting various input and output devices (e.g., keyboard, mouse, displays, printers, and speakers) to the computer 50, 60. Network interface 86 allows the computer to connect to various other devices attached to a network (e.g., network 70 of FIG. 22). Memory 90 provides volatile storage for computer software instructions 92 and data 94 used to implement many embodiments (e.g., how to control mmWall 600, 700, to supply voltage to meta-atoms 503, 504, and/or perform the beam alignment shown in FIGS. 20A-C). Disk storage 95 provides non-volatile storage for computer software instructions 92 and data 94 used to implement many embodiments. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, and tapes) that provides at least a portion of the software instructions for the system. Computer program product 92 can be installed by any suitable software installation procedure, as is well known in the art. In another embodiment, at least a portion of the software instructions may also be downloaded over a cable, communication and/or wireless connection. In other embodiments, the programs are a computer program propagated signal product 75 (FIG. 22) embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product. Generally speaking, the term "carrier medium" or transient carrier encompasses the foregoing transient signals, propagated signals, propagated medium, storage medium and the like. In other embodiments, the program product 92 may be implemented as a so-called Software as a Service (SaaS), or other installation or communication supporting end-users.

Embodiments may be mounted/deployed in any location where improved mmWave transmission is desired. For instance, embodiments can be mounted on a wall or other object that would have previously blocked mmWave transmission so as to convert a previous network obstruction into a beneficial part of the network that provides beam relay and control capabilities. Embodiments can provide full 360 degree beam steering with 89.9% single-beam efficiency and 74.5% double-beam efficiency.

Embodiments provide several key advantages to the operation of mmWave networks: 1) embodiments relay and re-focus incident transmission beams, thereby enabling the traversing of objects, such as actual walls, without attenuation; 2) embodiments provide, in real time, an alternative transmission path when the direct LoS path is blocked, for example by a human body; 3) embodiments enable concurrent multi-beam scanning of a space to find the best direction and path to a receiver, reducing the time delay caused by a single beam scanning; 4) embodiments enable multi-cast by creating and directing one beam per user, i.e., receiver, from a single transmission beam; 5) each element metasurface comprising embodiments is at least five times smaller than conventional antenna and, thus, embodiments have a larger number of elements than the phased array antenna and yield a significant gain enhancement; and 6) embodiments do not include a single radio frequency (RF) chain and, therefore, intrinsically consume little power. Furthermore, embodiments can be comprised of a programmable, metamaterials-based surface that can be controlled, in real time, to perform the tasks described previously.

The embodiments of the invention, such as the mmWall, described herein can enable, support and/or significantly improve mobile and wireless applications. Virtual reality (VR), augmented relating (AR), and mixed reality (MR) have undergone major advances and is increasingly being utilized in the entertainment industry and educational institutions. For instance, VR and AR can not only provide immersive gaming experiences, but also help in guiding the curated objects in a museum with digital versions of art and enable life-like training simulations to prepare public safety professionals. However, such applications are currently limited in terms of mobility as they require a physical connection via HDMI cable to exchange multiple Gbps of data between a data source (PC or game console) and the headset. For this reason, the use of mmWave links for such applications have been proposed. However, mmWaves experience significant difficulties with the presence of obstacles and reflections. Several existing mmWave relay systems have attempted to solve this link-blockage problem using reconfigurable mmWave reflectors that provide an alternative path when the existing links are blocked. However, these systems only allow mobility within a single room as they can only reflect the signal back.

The disclosed mmWall embodiments, e.g., 600, 700, 1000, on the other hand, adaptively establish a robust mmWave connection through both a reflective and transmissive path across the wall, thus enhancing the ability to move around through live events, with better sense of "presence."

Serverless computing is a cloud computing system in which the end users run applications without a traditional server operating system. Instead, the service operators provide and manage machine resources on demand. The most prominent platforms include Amazon Web Service (AWS), Google Cloud, Microsoft Azure, and Cloudflare. In particular, Google Cloud recently launched Game Servers, a managed service that provides gamers a cloud backend for running their games, including multi-player games. Such services open up a plethora of computing opportunities for mobile devices, which are often limited in computational resources.

However, strict latency constraints exist when the operators support real-time services like Game Servers, and these constraints exacerbate when the end users are mobile. Embodiments can significantly reduce this latency by continuously supporting multiple Gbps transmissions regardless of users being mobile in obstruction laden environments. Furthermore, embodiments, e.g., 600, 700, 1000, operate on both the downlink and the uplink, which are necessary for such services that require bi-directional communication. Thereby, embodiments can improve the Quality of Service (QoS) for the mobile devices using serverless computing.

Robotic automation requires high speed connectivity to stream video to the backend servers in order to accomplish the complex collaborative tasks. In fact, mmWave networks can play a significant role in providing high speed connectivity. However, when it comes to the smart robotic warehouses and retailers, there are an enormous number of end-nodes to support. Deploying multiple mmWave AP in every corner and space may allow multiple Gbps connection through LoS paths, but with a massive number of mobile robots, it adds additional complexity to the handover process. The use of mmWall 600, 700, 1000 not only mitigates complexity in coordinating the communication between the APs and the robots, but also leaves the end-node unchanged. Only the AP and mmWall 600, 700, 1000 need to be configured so that mmWall 600, 700, 1000 delegates the task of the AP.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A system for transforming an incident high frequency wave, the system comprising:
   a plurality of meta-atom pairs coupled to define a surface, wherein:
   each meta-atom pair of the plurality is comprised of a magnetic meta-atom and an electric meta-atom separated by a dielectric substrate, the magnetic meta-atom and the electric meta-atom configured to have a resonant frequency;
   each meta-atom pair of the plurality is configured to generate an electro-magnetic response by interacting with an incident high frequency wave, the generated electro-magnetic response being dependent on a voltage applied to each meta-atom pair; and
   the generated electro-magnetic response is configured to transform the incident high frequency wave, having a frequency matching the resonant frequency, received at the defined surface into an emitted wave from the defined surface.

2. The system of claim 1 wherein the emitted wave is at least one of: a relay of the incident high frequency wave, a reflection of the incident high frequency wave from the defined surface, a transmission of the incident high frequency wave through the defined surface, a redirection of the incident high frequency wave, a phase shift of the incident high frequency wave, a frequency shift of the incident high frequency wave, and a focusing of the incident high frequency wave.

3. The system of claim 1 wherein the emitted wave is a first emitted wave and the generated electro-magnetic response is further configured to transform the incident high frequency wave into the first emitted wave from the defined surface and a second emitted wave from the from the defined surface.

4. The system of claim 1 wherein the magnetic meta-atom and the electric meta-atom are circular and the resonant frequency is dependent on a radius of the circular magnetic meta-atom and a radius of the circular electric meta-atom.

5. The system of claim 4 wherein each radius is less than 1.1 mm.

6. The system of claim 1 wherein the voltage is applied to each meta-atom pair using a control line, the control line having a length and thickness that configure the control line to act as a choke at the resonant frequency.

7. The system of claim 1 further comprising:
   a processor, wherein the voltage applied is controlled by the processor and the processor is configured to modulate the voltage applied to modify properties of the generated electro-magnetic response and properties of the emitted wave.

8. The system of claim 7 wherein the processer is configured to modulate the voltage applied over time to modify the properties of the generated electro-magnetic response and the properties of the emitted wave.

9. The system of claim 8 wherein the processer is configured to modulate the applied voltage over time to modify the properties of the generated electro-magnetic response and the properties of the emitted wave in real time.

10. The system of claim 1 wherein the resonant frequency is at least 20 GHz.

11. A method for transforming an incident high frequency wave, the method comprising:
receiving an incident high frequency wave at a surface defined by a plurality of meta-atom pairs coupled, wherein each meta-atom pair of the plurality is comprised of a magnetic meta-atom and an electric meta-atom separated by a dielectric substrate, the magnetic meta-atom and the electric meta-atom configured to have a resonant frequency matching a frequency of the incident high frequency wave;
generating, by the plurality of meta-atom pairs interacting with the received incident high frequency wave, an electro-magnetic response;
applying a voltage to the plurality meta-atom pairs, the voltage configured to modulate the generated electro-magnetic response; and
transforming, based on the modulated generated electro-magnetic response, the incident high frequency wave received at the surface into an emitted wave from the surface.

12. The method of claim 11 wherein the emitted wave is at least one of: a relay of the incident high frequency wave, a reflection of the incident high frequency wave from the surface, a transmission of the incident high frequency wave through the surface, a redirection of the incident high frequency wave, a phase shift of the incident high frequency wave, a frequency shift of the incident high frequency wave, and a focusing of the incident high frequency wave.

13. The method of claim 11 wherein the emitted wave is a first emitted wave and the method further comprises, based on the modulated generated electro-magnetic response, transforming the incident high frequency wave into (i) the first emitted wave from the defined surface and (ii) a second emitted wave from the from the defined surface.

14. The method of claim 11 wherein the magnetic meta-atom and the electric meta-atom are circular and the resonant frequency is dependent on a radius of the circular magnetic meta-atom and a radius of the circular electric meta-atom.

15. The method of claim 11 wherein the incident high frequency wave is a millimeter wave and the resonant frequency is a millimeter wave frequency.

16. The method of claim 11 wherein the incident high frequency wave is one of a 5G signal, a Wi-Fi signal, or a network backhaul signal.

17. The method of claim 11 wherein the incident wave is received from a network base station and the method further comprises performing a beam alignment between the surface and the base station.

18. The method of claim 11 wherein the emitted wave is configured to be received by a user device and the method further comprises performing a beam alignment between the surface and the user device.

19. The method of claim 11 further comprising, via a user device that receives the emitted wave controlling the voltage applied to the plurality of meta-atom pairs.

20. The method of claim 19 wherein the user device and the surface are communicatively coupled with at least one of: a Bluetooth connection, radio connection, Wi-Fi connection, or telecommunication connection.

* * * * *